United States Patent
Akkarakaran et al.

(10) Patent No.: US 12,127,112 B2
(45) Date of Patent: *Oct. 22, 2024

(54) INTEGRATED ACCESS AND BACKHAUL SIDELINK COMMUNICATIONS

(71) Applicant: QUALCOMM Incorporated, San Diego, CA (US)

(72) Inventors: Sony Akkarakaran, Poway, CA (US); Navid Abedini, Basking Ridge, NJ (US); Tao Luo, San Diego, CA (US); Junyi Li, Fairless Hills, PA (US); Naeem Akl, Somerville, NJ (US)

(*) Notice: Subject to any disclaimer, the term of this patent is extended or adjusted under 35 U.S.C. 154(b) by 508 days.

This patent is subject to a terminal disclaimer.

(21) Appl. No.: 17/385,158

(22) Filed: Jul. 26, 2021

(65) Prior Publication Data

US 2023/0022723 A1    Jan. 26, 2023

(51) Int. Cl.
*H04W 48/20* (2009.01)
*H04W 56/00* (2009.01)
*H04W 88/14* (2009.01)
*H04W 92/18* (2009.01)

(52) U.S. Cl.
CPC ......... *H04W 48/20* (2013.01); *H04W 56/001* (2013.01); *H04W 88/14* (2013.01); *H04W 92/18* (2013.01)

(58) Field of Classification Search
CPC ... H04W 48/20; H04W 88/14; H04W 56/001; H04W 92/18; H04W 72/04; H04W 88/08; H04W 76/00
See application file for complete search history.

(56) References Cited

U.S. PATENT DOCUMENTS

| | | | |
|---|---|---|---|
| 11,490,448 B1* | 11/2022 | Kuo | H04W 76/22 |
| 2020/0413391 A1 | 12/2020 | Luo et al. | |
| 2021/0159946 A1 | 5/2021 | Raghavan et al. | |
| 2021/0377884 A1* | 12/2021 | Lee | H04W 92/18 |
| 2022/0053418 A1* | 2/2022 | Back | H04B 17/318 |
| 2022/0070934 A1* | 3/2022 | Yang | H04W 76/28 |
| 2022/0110180 A1* | 4/2022 | Jung | H04W 24/10 |
| 2022/0131657 A1* | 4/2022 | Elshafie | H04B 7/15507 |
| 2022/0174758 A1* | 6/2022 | Pan | H04W 76/12 |

(Continued)

OTHER PUBLICATIONS

International Search Report and Written Opinion—PCT/US2022/073839—ISA/EPO—Nov. 11, 2022 (2101877WO).

(Continued)

*Primary Examiner* — Hassan A Phillips
*Assistant Examiner* — Prenell P Jones

(57) ABSTRACT

Methods, systems, and devices for wireless communications are described. The described techniques provide for a first user equipment (UE) receiving, from an integrated access and backhaul (IAB) node, an indication that the IAB node supports sidelink communications. The indication may be broadcast by the IAB node or indicated via an established connection, such as a radio resource control (RRC) connection. The first UE may select the IAB node to relay communications between the first UE and a second wireless node based at least in part on the indication that the IAB node supports sidelink communications. The UE may communicate one or more data messages with the second wireless node via the IAB node in accordance the selecting of the IAB node to relay the communications.

30 Claims, 16 Drawing Sheets

(56) References Cited

U.S. PATENT DOCUMENTS

| | | | |
|---|---|---|---|
| 2022/0174762 A1* | 6/2022 | Pan | H04W 76/27 |
| 2022/0210847 A1* | 6/2022 | Pan | H04W 76/12 |
| 2022/0271791 A1 | 8/2022 | Zhang et al. | |
| 2022/0330115 A1* | 10/2022 | Back | H04W 36/03 |
| 2022/0352915 A1* | 11/2022 | Abedini | H04B 1/1027 |
| 2022/0368503 A1* | 11/2022 | Sun | H04L 5/0055 |
| 2023/0022723 A1* | 1/2023 | Akkarakaran | H04W 88/14 |
| 2023/0025046 A1* | 1/2023 | Akkarakaran | H04W 8/005 |
| 2023/0027099 A1* | 1/2023 | Akkarakaran | H04W 12/08 |
| 2023/0029173 A1* | 1/2023 | Abedini | H04W 52/243 |
| 2023/0036240 A1* | 2/2023 | You | H04W 84/04 |
| 2023/0053351 A1* | 2/2023 | Cheng | H04W 24/10 |
| 2023/0055869 A1* | 2/2023 | You | H04L 27/2666 |
| 2023/0074220 A1* | 3/2023 | Back | H04W 76/20 |
| 2023/0078181 A1* | 3/2023 | Ghanbarinejad | H04W 52/383 |
| 2023/0079552 A1* | 3/2023 | Back | H04W 40/20 370/315 |
| 2023/0108413 A1* | 4/2023 | You | H04W 72/535 370/329 |
| 2023/0112922 A1* | 4/2023 | Zhu | H04W 24/10 370/329 |
| 2023/0164747 A1* | 5/2023 | You | H04L 5/00 370/329 |
| 2023/0171745 A1* | 6/2023 | Ghanbarinejad | H04W 76/19 370/329 |
| 2023/0276313 A1* | 8/2023 | Wu | H04W 36/033 370/331 |

OTHER PUBLICATIONS

Oppo: "Utilising Sidelink in IAB", 3GPP TSG-RAN WG1 Meeting #93, R1-1806833, 3rd Generation Partnership Project, Mobile Competence Centre, 650, Route Des Lucioles, F-06921 Sophia-Antipolis Cedex, France, vol. RAN WG1, No. Busan, Korea, May 21, 2018-May 25, 2018, May 11, 2018, pp. 1-4, XP051461985, Paragraphs, Section 1, 2, Observation2, Figure 2.

Qualcomm Incorporated (Mediator): "Rel-17 IAB Email Discussion—Report", 3GPP TSG RAN meeting #86, RP-193094, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 8, 2019, 39 Pages, XP051838727, p. 13-p. 14, line "Omesh".

Sony: "Overview of Layer-2 and Layer-3 Sidelink Relay Mechanisms", 3GPP TSG-RAN WG2 Meeting #111 electronic, R2-2007181, 3rd Generation Partnership Project, Mobile Competence Centre, 650, Route Des Lucioles, F-06921 Sophia-Antipolis Cedex, France, vol. RAN WG2 , No. electronic, Aug. 17, 2020-Aug. 28, 2020, Aug. 6, 2020, 6 Pages, XP051910931, Paragraphs, Section 2.1, 2.2, 2.4.

* cited by examiner

INTEGRATED ACCESS AND BACKHAUL SIDELINK COMMUNICATIONS

FIELD OF TECHNOLOGY

The following relates to wireless communications, including integrated access and backhaul sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems (e.g., 5G new radio (NR) systems), infrastructure and spectral resources for NR access may additionally support wireless backhaul link capabilities in supplement to wireline backhaul connections, providing an integrated access and backhaul (IAB) network architecture. One or more base stations may include central units (CUs) and distributed units (DUs) and may be referred to as donor base stations. One or more DUs associated with a donor base station may be partially controlled by CUs associated with the donor base station. The one or more donor base stations (e.g., IAB donors) may be in communication with one or more additional base stations (e.g., IAB nodes) via supported access and backhaul links. IAB nodes may support mobile terminal (MT) functionality controlled and/or scheduled by DUs of a coupled IAB donor. In addition, the IAB nodes may include DUs that support communication links with additional entities (e.g., IAB nodes, UEs, etc.) within the relay chain or configuration of the access network (e.g., downstream). In some examples, the IAB of the IAB network may serve UEs that support sidelink communications.

SUMMARY

The described techniques relate to improved methods, systems, devices, and apparatuses that support integrated access and backhaul (IAB) sidelink communications. Generally, the described techniques provide for a first user equipment (UE) receiving, from an IAB node, an indication that the IAB node supports sidelink communications. The indication may be broadcast by the IAB node or indicated via an established connection, such as a radio resource control (RRC) connection. The first UE may select the IAB node to relay communications between the first UE and a second wireless node based at least in part on the indication that the IAB node supports sidelink communications. The UE may communicate one or more data messages with the second wireless node via the IAB node in accordance the selecting of the IAB node to relay the communications.

A method for wireless communication at a first user equipment (UE) is described. The method may include receiving, from an integrated access and backhaul (IAB) node, an indication that the IAB node supports sidelink communications, selecting the IAB node to relay communications between the first UE and a second wireless node based on the indication that the IAB node supports sidelink communications, and communicating one or more data messages with the second wireless node via the IAB node in accordance with the selecting of the IAB node to relay the communications.

An apparatus for wireless communication at a first UE is described. The apparatus may include a processor, memory coupled with the processor, and instructions stored in the memory. The instructions may be executable by the processor to cause the apparatus to receive, from an integrated access and backhaul (IAB) node, an indication that the IAB node supports sidelink communications, select the IAB node to relay communications between the first UE and a second wireless node based on the indication that the IAB node supports sidelink communications, and communicate one or more data messages with the second wireless node via the IAB node in accordance with the selecting of the IAB node to relay the communications.

Another apparatus for wireless communication at a first UE is described. The apparatus may include means for receiving, from an integrated access and backhaul (IAB) node, an indication that the IAB node supports sidelink communications, means for selecting the IAB node to relay communications between the first UE and a second wireless node based on the indication that the IAB node supports sidelink communications, and means for communicating one or more data messages with the second wireless node via the IAB node in accordance with the selecting of the IAB node to relay the communications.

A non-transitory computer-readable medium storing code for wireless communication at a first UE is described. The code may include instructions executable by a processor to receive, from an integrated access and backhaul (IAB) node, an indication that the IAB node supports sidelink communications, select the IAB node to relay communications between the first UE and a second wireless node based on the indication that the IAB node supports sidelink communications, and communicate one or more data messages with the second wireless node via the IAB node in accordance with the selecting of the IAB node to relay the communications.

In some examples of the method, apparatuses, and non-transitory computer-readable medium described herein, receiving the indication that the IAB node supports sidelink communications may include operations, features, means, or instructions for receiving the indication from a distributed unit of the IAB node.

Some examples of the method, apparatuses, and non-transitory computer-readable medium described herein may further include operations, features, means, or instructions for receiving, on a sidelink connection established between the first UE and the IAB node, an indication that the IAB node supports IAB functionality.

In some examples of the method, apparatuses, and non-transitory computer-readable medium described herein, receiving the indication that the IAB node supports sidelink communications may include operations, features, means, or instructions for receiving, from the IAB node, an indication of a quasi-co-location relationship between a downlink reference signal corresponding to a distributed unit of the IAB node and a sidelink reference signal corresponding to sidelink functionality of the IAB node, where the downlink reference signal may be a downlink synchronization signal block or a downlink channel state information reference signal and the sidelink reference signal may be a sidelink synchronization signal block or a sidelink channel state information reference signal, where the first UE communicates with the second wireless node based on the indication of the quasi co-location relationship.

In some examples of the method, apparatuses, and non-transitory computer-readable medium described herein, receiving the indication of the quasi co-location relationship may include operations, features, means, or instructions for receiving the indication of the quasi co-location relationship over a radio resource control connection with the distributed unit of the IAB node, a sidelink connection established with the IAB node, or both the radio resource control connection and the sidelink connection.

Some examples of the method, apparatuses, and non-transitory computer-readable medium described herein may further include operations, features, means, or instructions for receiving an indication that specifies that the IAB node supports UE to UE relay communications, UE to network relay communications, or both.

Some examples of the method, apparatuses, and non-transitory computer-readable medium described herein may further include operations, features, means, or instructions for receiving, from the IAB node via a sidelink connection, configuration information that the first UE may be to use for communications with the IAB node, where the first UE communicates the one or more data messages in accordance with the configuration information and where the configuration information includes one or more cell identities, frequency information, system information, a cell-barred state of a distributed unit of the IAB node, child support information of the distributed unit of the IAB node, a time domain duplexing configuration, a slot status of a slot of a cell, transmission reception point information of the IAB node, a mobility state of the IAB node, or any combination thereof.

Some examples of the method, apparatuses, and non-transitory computer-readable medium described herein may further include operations, features, means, or instructions for receiving, from the IAB node via a downlink message, sidelink resource configuration information that the first UE may be to use for communications with the IAB node via sidelink functionality of the IAB node, where the first UE communicates with the second wireless node via the sidelink functionality of the IAB node based on the sidelink resource configuration information.

In some examples of the method, apparatuses, and non-transitory computer-readable medium described herein, selecting the IAB node may include operations, features, means, or instructions for determining to use a distributed unit of the IAB node or sidelink functionality of the IAB node to relay the one or more data messages between the first UE and the second wireless node.

In some examples of the method, apparatuses, and non-transitory computer-readable medium described herein, determining to use the distributed unit or the sidelink functionality may include operations, features, means, or instructions for selecting the distributed unit or the sidelink functionality or receiving an indication that the UE may be to use the distributed unit or the sidelink functionality from the IAB node, a central unit, or another network node.

In some examples of the method, apparatuses, and non-transitory computer-readable medium described herein, determining to use the distributed unit or the sidelink functionality may include operations, features, means, or instructions for determining to use the distributed unit or the sidelink functionality based on a mobility state of the UE, a mobility state of the IAB node, or both.

In some examples of the method, apparatuses, and non-transitory computer-readable medium described herein, the second wireless node may be a second UE, a second IAB node, an IAB-donor, or a base station.

In some examples of the method, apparatuses, and non-transitory computer-readable medium described herein, receiving the indication that the IAB node supports sidelink communications may include operations, features, means, or instructions for receiving the indication via radio resource control signaling, in a master information block, or in a system information block.

A method for wireless communication at an integrated access and backhaul (IAB) node is described. The method may include transmitting an indication that the IAB node supports sidelink communications, where the IAB node includes a mobile termination unit and a distributed unit, establishing a sidelink connection with a peer node according to the transmitted indication, and communicating one or more data messages with the peer node over the established sidelink connection.

An apparatus for wireless communication at an integrated access and backhaul (IAB) node is described. The apparatus may include a processor, memory coupled with the processor, and instructions stored in the memory. The instructions may be executable by the processor to cause the apparatus to transmit an indication that the IAB node supports sidelink communications, where the IAB node includes a mobile termination unit and a distributed unit, establish a sidelink connection with a peer node according to the transmitted indication, and communicate one or more data messages with the peer node over the established sidelink connection.

Another apparatus for wireless communication at an integrated access and backhaul (IAB) node is described. The apparatus may include means for transmitting an indication that the IAB node supports sidelink communications, where the IAB node includes a mobile termination unit and a distributed unit, means for establishing a sidelink connection with a peer node according to the transmitted indication, and means for communicating one or more data messages with the peer node over the established sidelink connection.

A non-transitory computer-readable medium storing code for wireless communication at an integrated access and backhaul (IAB) node is described. The code may include instructions executable by a processor to transmit an indication that the IAB node supports sidelink communications, where the IAB node includes a mobile termination unit and a distributed unit, establish a sidelink connection with a peer node according to the transmitted indication, and communicate one or more data messages with the peer node over the established sidelink connection.

In some examples of the method, apparatuses, and non-transitory computer-readable medium described herein, transmitting the indication that the IAB node supports sidelink communications may include operations, features, means, or instructions for transmitting the indication via the distributed unit of the IAB node.

Some examples of the method, apparatuses, and non-transitory computer-readable medium described herein may further include operations, features, means, or instructions for transmitting, via the sidelink connection an indication that the IAB node supports IAB functionality.

In some examples of the method, apparatuses, and non-transitory computer-readable medium described herein, transmitting the indication may include operations, features, means, or instructions for transmitting an indication of a quasi co-location relationship between a downlink reference signal corresponding to the distributed unit of the IAB node and a sidelink reference signal corresponding to sidelink functionality of the IAB node, where the downlink reference signal may be a downlink synchronization signal block or a downlink channel state information reference signal and the sidelink reference signal may be a sidelink synchronization signal block or a sidelink channel state information reference signal.

In some examples of the method, apparatuses, and non-transitory computer-readable medium described herein, transmitting the indication of the quasi co-location relationship may include operations, features, means, or instructions for transmitting the indication of the quasi co-location relationship over a radio resource control connection between the distributed unit and the peer node, the sidelink connection established with the peer node, or both the radio resource control connection and the sidelink connection.

Some examples of the method, apparatuses, and non-transitory computer-readable medium described herein may further include operations, features, means, or instructions for transmitting an indication that specifies that the IAB node supports UE to UE relay communications, UE to network relay communications, or both.

In some examples of the method, apparatuses, and non-transitory computer-readable medium described herein, the peer node may be a UE and the method, apparatuses, and non-transitory computer-readable medium may include further operations, features, means, or instructions for transmitting, to the UE via the sidelink connection, configuration information that the peer node may be to use for communications with the IAB node, where the configuration information includes one or more cell identities, frequency information, system information, a cell-barred state of the distributed unit of the IAB node, child support information of the distributed unit of the IAB node, a time domain duplexing configuration, a slot status of a slot of a cell, transmission reception point information of the IAB node, a mobility state of the IAB node, or any combination thereof.

In some examples of the method, apparatuses, and non-transitory computer-readable medium described herein, the peer node may be a UE and the method, apparatuses, and non-transitory computer-readable medium may include further operations, features, means, or instructions for transmitting, to the peer node via a downlink message, sidelink resource configuration information that the peer node may be to use for communications with the IAB node via the sidelink functionality of the IAB node, where the peer node may be a UE or a second IAB node.

Some examples of the method, apparatuses, and non-transitory computer-readable medium described herein may further include operations, features, means, or instructions for determining to use the distributed unit or sidelink functionality for communications with the peer node or receiving an indication that the IAB node may be to use the distributed unit or the sidelink functionality from a second IAB node or a central unit.

Some examples of the method, apparatuses, and non-transitory computer-readable medium described herein may further include operations, features, means, or instructions for communicating with the first UE using the sidelink connection based on a first mobility state of the first UE relative to the IAB node and communicating with a second UE using the distributed unit based on a second mobility state of the second UE relative to the IAB node.

Some examples of the method, apparatuses, and non-transitory computer-readable medium described herein may further include operations, features, means, or instructions for communicating with a distributed unit of a parent IAB node of the IAB node using the mobile termination unit of the IAB node or a sidelink functionality of the IAB node based on a mobility state of the parent IAB node.

Some examples of the method, apparatuses, and non-transitory computer-readable medium described herein may further include operations, features, means, or instructions for determining whether the IAB node may be to be a parent node of the second IAB node or whether the second IAB node may be to be a parent node of the IAB node.

In some examples of the method, apparatuses, and non-transitory computer-readable medium described herein, the IAB node and the second IAB node share a same central unit.

Some examples of the method, apparatuses, and non-transitory computer-readable medium described herein may further include operations, features, means, or instructions for communicating between the distributed unit of the IAB node and a distributed unit of the second IAB node over the sidelink connection.

In some examples of the method, apparatuses, and non-transitory computer-readable medium described herein, transmitting the indication that the IAB node supports sidelink communications may include operations, features, means, or instructions for transmitting the indication via radio resource control signaling, in a master information block, or in a system information block.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

The described techniques support sidelink communications between nodes of an integrated access and backhaul (IAB) network. The network may include one or more connected base stations and user equipments (UEs) supporting multiple communication links within a relay chain. A core network may be associated with one or more access networks (ANs). In networks employing distributed node techniques, each AN may include a central unit (CU) (e.g., associated with a donor base station) and one or more distributed units (DUs) (e.g., also associated with the donor base station) for scheduling communications with mobile terminals (MTs) (e.g., associated with an intermediary base station) or with UEs of the network. A network node that is configured with a DU and MT to support communications between an IAB donor, other IAB nodes, and UEs may be referred to as an IAB node. According to techniques and architectures described herein, an IAB node may be configured with sidelink functionality to support sidelink communications.

A sidelink capable IAB node may indicate that it supports sidelink communications. In some cases, the indication is transmitted over a Uu link to a parent node or to a child node. For example, the IAB node may indicate that it supports sidelink communications via a master information block (MIB), system information block (SIB), or via radio resource control (RRC) message. Additionally, the IAB node may indicate its capability to support IAB relaying via a sidelink connection. For example, the IAB node may indicate its capability to support sidelink functionality via a sidelink MIB or via a unicast message. As described in further detail herein, these capability indication techniques may support IAB topology discovery as well as improved communication reliability and throughput in some scenarios, such as high mobility scenarios.

Aspects of the disclosure are initially described in the context of wireless communications systems. Aspects of the disclosure are further described with respect to a wireless communications system illustrating various connections in an IAB network with sidelink functionality, a network that illustrates sidelink communications, and a process flow diagram. Aspects of the disclosure are further illustrated by and described with reference to apparatus diagrams, system diagrams, and flowcharts that relate to integrated access and backhaul sidelink communications.

Figure 1:
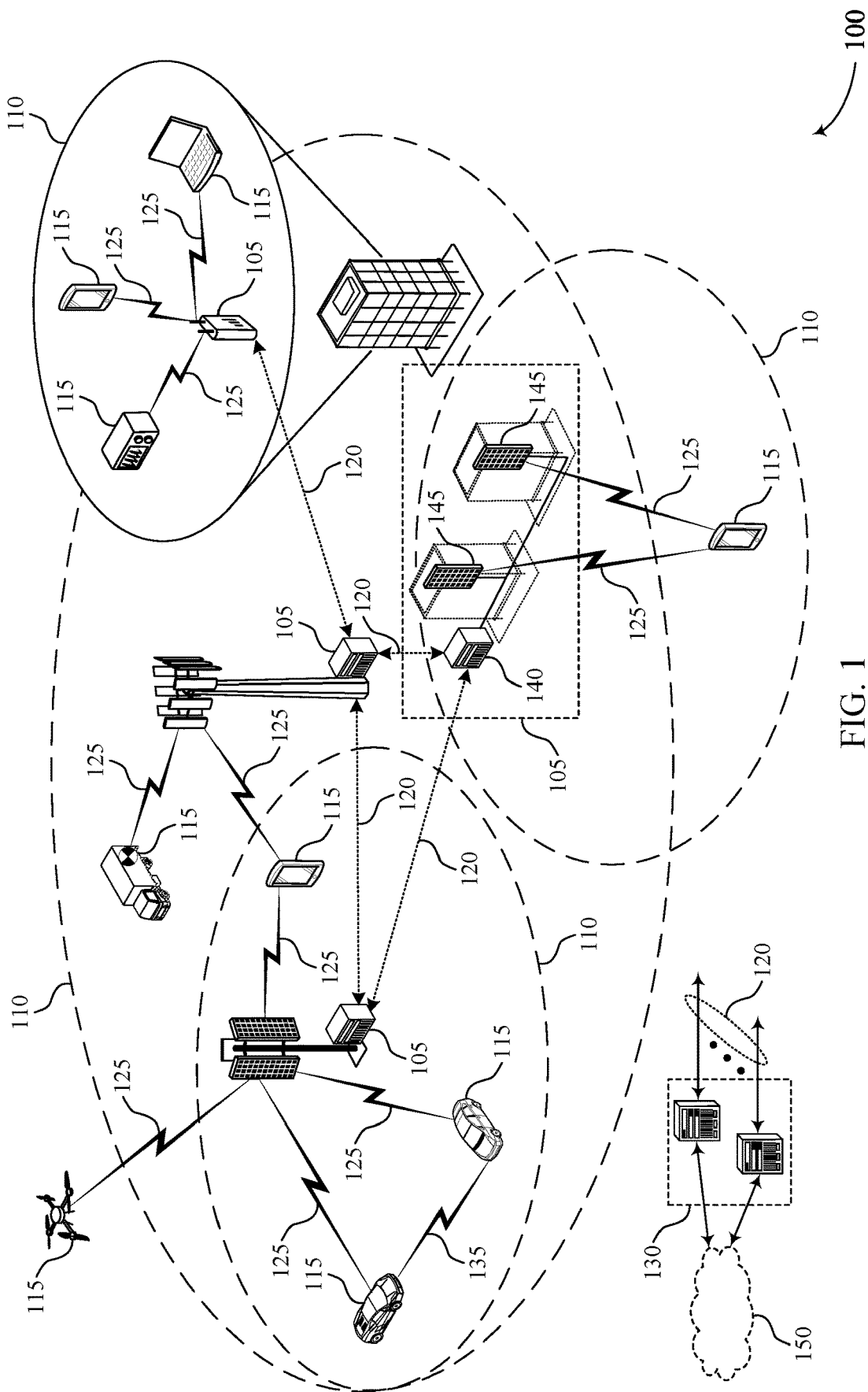
FIG. 1 illustrates an example of a wireless communications system that supports integrated access and backhaul sidelink communications in accordance with aspects of the present disclosure.

FIG. 1 illustrates an example of a wireless communications system 100 that supports integrated access and backhaul sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100, one or more base stations 105 may include CUs and DUs, where one or more DUs associated with a base station 105 may be partially controlled by a CU associated with the respective base station 105. The base station CUs may be a component of a database, data center, or the core network 130 (e.g., a 5G NR core network (5GC)). In some examples, a base station CU (e.g., a relay base station 105) may communicate with a one or more DUs supported by antecedent (e.g., parent) base stations 105 via a backhaul link (e.g., a wireline backhaul or a wireless backhaul). As another example, in IAB networks, a base station CU (e.g., a donor base station 105) may communicate with the core network 130 (e.g., the NGC) via a backhaul link (e.g., a wireline backhaul or wireless backhaul). The donor base station 105 may be referred to, for example in an IAB network, as an IAB donor and may be in communication with one or more IAB nodes (e.g., one or more additional base stations 105) operating as base station DUs relative to the IAB donor and one or more UEs. For example, an IAB network may include a chain of wireless devices (e.g., starting with the donor base station 105 (a RAN node that terminates an interface with the core network) and ending with a UE 115, with any number of IAB nodes in between). IAB nodes may support mobile terminal (MT) functionality (which may also be referred to as UE function (UE-F)) controlled and scheduled by an IAB donor, or another IAB node, as its parent node as well as DU functionality (which may also be referred to as an access node function (AN-F)) relative to additional entities (e.g., IAB nodes, UEs, etc.) within the relay chain or configuration of the access network (e.g., downstream). These relay mechanisms may forward traffic along to the additional entities, extend the range of wireless access for one or more base stations, enhance the density of backhaul capability within serving cells, etc.

The wireless communications systems 100 may also support IAB nodes that configured to support sidelink communications. As IAB nodes may serve UEs 115 that may also be configured to support sidelink communication, the IAB nodes that support sidelink communications may be used to increase network communication throughput, increase reliability, among other benefits. For example, some sidelink communication techniques may be implemented in high UE mobility scenarios. These techniques may be used to support IAB relaying where one or more IAB nodes, one or more UEs, or a combination may operate in high mobility environments. Thus, the sidelink communications may be used rather than, or in addition to, Uu interface communications or F1 communications.

In IAB node may indicate its capability to support sidelink communications and/or its capability to support IAB relaying. For example, the IAB node (e.g., a base station 105) may indicate, over a Uu link, that the IAB node supports sidelink communications. The IAB node may indicate, over a sidelink, that the IAB node supports IAB functionality (e.g., IAB relaying). These indication techniques may support IAB topology discovery as well as improved communication reliability and throughput by leveraging sidelink functionality in addition to Uu communications in various scenarios, such as high mobility scenarios.

Figure 2:
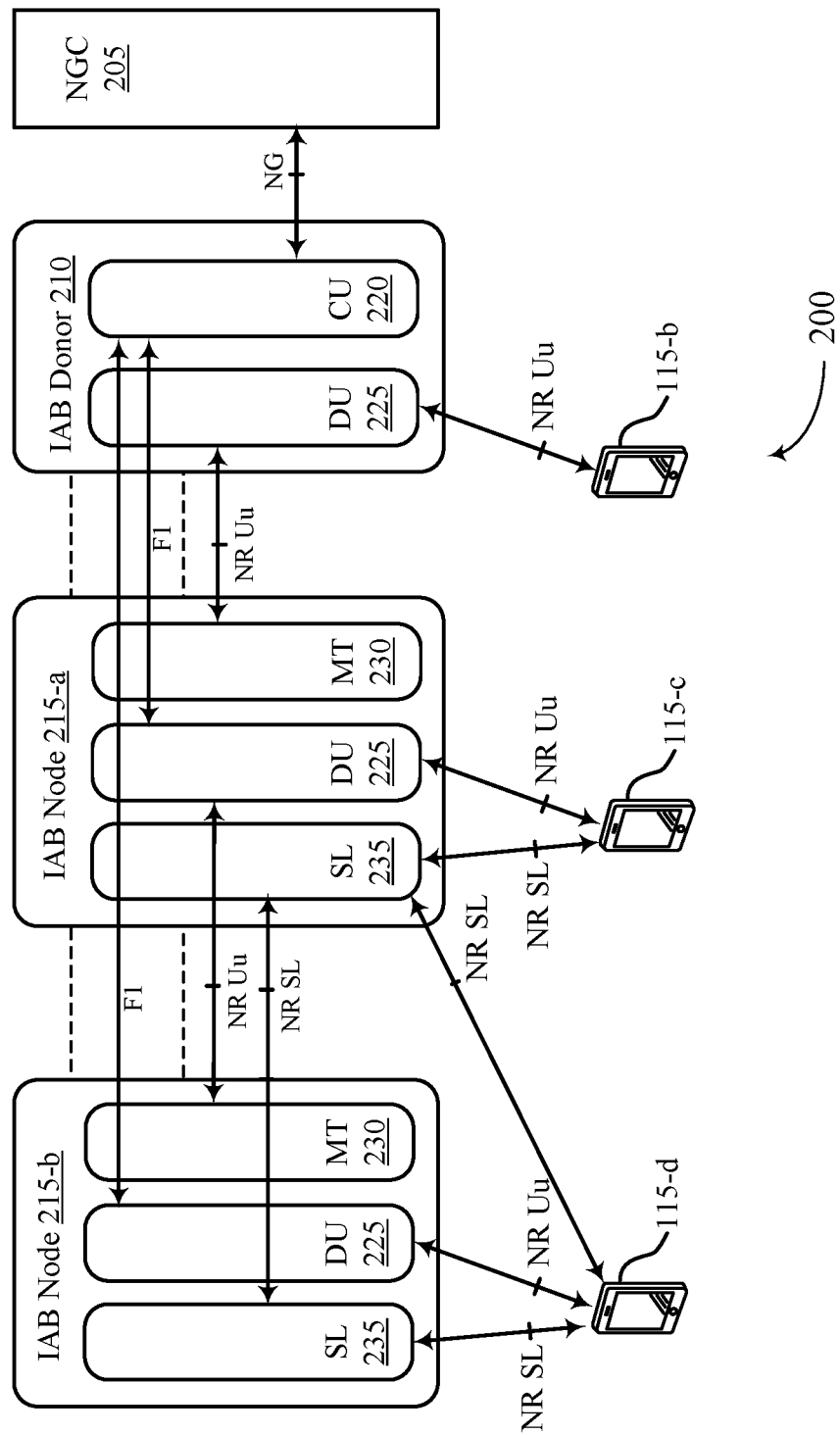
FIG. 2 illustrates an example of a wireless communications system that supports integrated access and backhaul sidelink communications in accordance with aspects of the present disclosure.

FIG. 2 illustrates an example of a wireless communications system 200 that supports integrated access and backhaul sidelink communications in accordance with aspects of the present disclosure. Wireless communications system 200 may include a core network 205 (e.g., a next generation core network (NGC)), an IAB donor 210, IAB nodes 215, and UEs 115, where IAB nodes 215 may be partially controlled by each other and/or the IAB donor 210. The IAB donor 210 and IAB nodes 215 may be examples of aspects of base stations 105, and core network 205 may be an example of aspects of core network 130, as described with reference to FIG. 1. IAB donor 210 and one or more IAB nodes 215 may be configured as (e.g., or in communication according to) some relay chain.

For example, an access network (AN) may refer to communications between access nodes (e.g., IAB donor 210), IAB nodes 215-a and 215-b, and one or more UEs 115 (e.g., UEs 115-b, 115-c, and 115-d). The IAB donor 210 may facilitate connection between the core network 205 and the AN (e.g., via a wireline or wireless connection to the core network 205). That is, an IAB donor 210 may refer to a radio access network (RAN) node with a wireline or wireless connection to core network 205. The IAB donor 210 may include a CU 220 and at least one DU 225, where the CU 220 may communicate with the core network 205 over an NG interface (e.g., some backhaul link). The CU 220 may host layer 2 (L3) (e.g., radio resource control (RRC), service data adaption protocol (SDAP), packet data convergence protocol (PDCP), etc.) functionality and signaling. The at least one DU 225 may host lower layer, such as layer 1 (L1) and layer 2 (L2) (e.g., radio link control (RLC), media access control (MAC), physical (PHY), etc.) functionality and signaling, and may each be at least partially controlled by the CU 220. The DU 225 may support one or multiple different cells. IAB donor 210 and IAB nodes 215-a and 215-b may communicate over an F1 interface according to some protocol that defines signaling messages (e.g., F1-AP protocol). Additionally, CU 220 may communicate with the core network 205 over an NG interface (which may be an example of a portion of backhaul link), and may communicate with other CUs 220 (e.g., a CU associated with an alternative IAB donor 210) over an Xn-C interface (which may be an example of a portion of a backhaul link).

IAB nodes 215 may refer to a RAN node that provides IAB functionality (e.g., access for UEs 115, wireless self-backhauling capabilities, etc.). IAB nodes 215 may include a distributed unit (DU) 225 and a mobile terminal (MT) 230. A DU 225 may act as a distributed scheduling node towards child nodes associated with the IAB node 215, and the MT 230 may act as a scheduled node towards parent nodes associated with the IAB node 215. That is, an IAB donor 210 may be referred to as a parent node in communication with one or more child nodes (e.g., an IAB donor may relay transmissions for UEs through one or more other IAB nodes 215). Additionally, an IAB node 215 may also be referred to as a parent node or a child node to other IAB nodes 215, depending on the relay chain or configuration of the AN. Therefore, the MT entity of IAB nodes 215 (e.g., MTs 230) may provide a Uu interface for a child node to receive signaling from a parent IAB node, and the DU interface (e.g., DUs 225) may provide a Uu interface for a parent node to signal to a child IAB node or UE 115.

For example, IAB node 215-a may be referred to a parent node associated with IAB node 215-b, and a child node associated with IAB donor 210. The IAB donor 210 may include a CU 220 with a wireline (e.g., optical fiber) or wireless connection to the core network 205, and may act as parent node to IAB nodes 215-a and 215-b. For example, the DU 225 of IAB donor 210 may relay transmissions to UEs 115-c and 115-d through IAB nodes 215-a and 215-b, and may directly signal transmissions to the UE 115-b. The CU 220 of IAB donor 210 may signal communication link establishment via an F1 interface to IAB nodes 215-a and 215-b, and the IAB nodes 215-a and 215-b may schedule transmissions (e.g., transmissions to the UEs 115 relayed from the IAB donor 210) through the DUs 225. That is, data may be relayed to and from IAB nodes 215-a and 215-b via signaling over an NR Uu interface to MT 230 of the IABs node 215-a and 215-b. Communications with IAB node 215-a may be scheduled by DU 225 of IAB donor 210 and communications with IAB node 215-b may be scheduled by DU 225 of IAB Node 215-a.

As described herein, the wireless communications system 200 may support nodes configured with sidelink functionality. For example, IAB nodes 215-a and 215-b include sidelink functionality 235. The sidelink functionality 235 may be supported by the components that support the DU 225 and/or the MT or may be supported by separate components, such as separate radio frequency circuitry and antennas.

IAB nodes 215 may advertise (e.g., broadcast) their support for IAB functionality (e.g., that the IAB node 215 is an IAB relay) and sidelink functionality. For example, the IAB node 215 may advertise over a sidelink connection that the IAB node 215 is an IAB relay. Additionally or alternatively, the IAB node 215 may advertise over a Uu link connection that the IAB node 215 includes sidelink functionality 235. These techniques may support IAB topology determination. For example, UEs 115 that receive these indications (advertisements) may account for these functionalities for relay selection. The sidelink functionality that is advertised over a Uu link may be broadcast in system information such as a MIB or a SIB or transmitted (e.g., unicast) in an RRC message. The IAB node functionality (e.g., IAB relay indication) may be transmitted by the IAB node 215 using a sidelink MIB (SL-MIB) or in a unicast message to a UE 115.

In some cases, the indications of IAB and sidelink functionality may be implicit or explicit. For example, the IAB node 215 may indicate a quasi co-location (QCL) relationship between a downlink reference signal corresponding to the DU 225 of the IAB node 215 and a sidelink reference signal corresponding to the sidelink functionality 235 of the IAB node 215. The downlink reference signal may be an example of a synchronization signal block (SSB) or a channel state information reference signal (CSI-RS). The sidelink reference signal may be an example of a sidelink SSB (SL-SSB) or a SL-CSI-RS. The QCL relationship may be indicated or advertised by the IAB node 215 over the sidelink connection and/or the Uu connection. Further, the QCL relationship may be configured at or indicated to the IAB node 215 by a parent node, control node, or CU 220. For example, the IAB node 215-a may configure the QCL relationship at the IAB node 215-b (e.g., the IAB node 215-a is a parent node of the IAB node 215-b).

The sidelink functionality 235 may support sidelink UE to UE relay capability or UE to network relay capability. In an example a UE to UE relay scenario, the IAB node 215 may establish a first sidelink connection with the UE 115-c and a second sidelink connection with the UE 115-d. The IAB node 215 may relay communications, using sidelink functionality 235, between the UE 115-c and 115-d. In an example UE to network relay scenario, the IAB node 215 may establish the sidelink connection with the UE 115-c and relay communications between the UE 115-c and the core network 205 (e.g., the NGC). The IAB node 215 may indicate its capability to support one or both of UE to UE relaying or UE to network relaying.

As described herein, a UE 115 that receives an indication of IAB and/or SL functionality from an IAB node 215 may select a relay based on the indication. For example, a UE 115 may determine to use a Uu connection to a DU 225 of an IAB node 215 or a sidelink connection to sidelink functionality 235 of the IAB node 215 for supporting communications (e.g., relaying communications). In some examples, the determination is performed based on a selection at the UE 115, an indication by the IAB node 215, the CU 220, or another network node (e.g., another IAB node 215).

In some cases, the selection of the IAB node 215 as well as the communication link (e.g., the Uu or sidelink) that is used may be based on the mobility state of the UE 115 and the IAB node 215. For example, when a IAB node 215 is implemented in a vehicle such as a train, bus, plane, etc., and various UEs 115 traveling with the vehicle are served by the IAB node 215, then the UEs 115 traveling with (within) the vehicle may be served by the DU 225 of the IAB node 215, since the IAB node 215 may appear to be a fixed cell to the UEs 115 traveling with the IAB node 215. However, external UEs 115 (e.g., UEs 115 that are not traveling with the vehicle carrying the IAB node 215) that may be in communication with the IAB node 215, may be served using sidelink functionality 235. This configuration may be used because sidelink functionality may be configured for high mobility environments (e.g., both the IAB node 215 and UE 115 are mobile).

Further, for the mobility scenario described above, the MT 230 of the IAB node 215 may communicate with a stationary parent DU 225 using a Uu link. If the parent DU 225 is mobile, then MT 230 of the IAB node 215 may communicate with the sidelink functionality 235 of the parent IAB node 215. For example, if both the IAB node 215-a and the IAB node 215-b are mobile, then the IAB node 215-b may communicate with the sidelink functionality 235 of the parent IAB node 215-a. As an alternative to these mobility designs, then sidelink relaying may be used instead of mobile IAB functionality. These techniques may include a star topology optimization, where the topology is configured as multiple "stars," where the hub of each star is the vehicle IAB node 215 and the clients of the hub are the UEs 115 within the vehicle. In such cases, the IAB node 215 may communicate with the UEs 115 using the sidelink functionality 235.

In some cases, the sidelink functionality 235 may be leveraged to support the IAB node 215. For example, some of the IAB configuration information may be indicated or advertised over a sidelink connection. Such information may include cell identifiers (cell IDs), frequency information (e.g., synchronization raster information), some or all of the information that is included in a SIB1 message (e.g., SSB bitmap, periodicity, QCL relationship information), random access channel (RACH) configuration), cell barred statuses of DUs 225, children support of IAB DUs 225, TDD configurations and/or hard, soft, not-available (HSNA) configuration of slots of DU 225 cells, transmission-reception point (TRP) information of the DU 225, mobility state of the IAB node 215, or any combination thereof. Further, some or all of the sidelink configuration information may be indicated or advertised over the Uu link (e.g., downlink connection). Such sidelink information may include resource information, such as SSB information.

Figure 3:
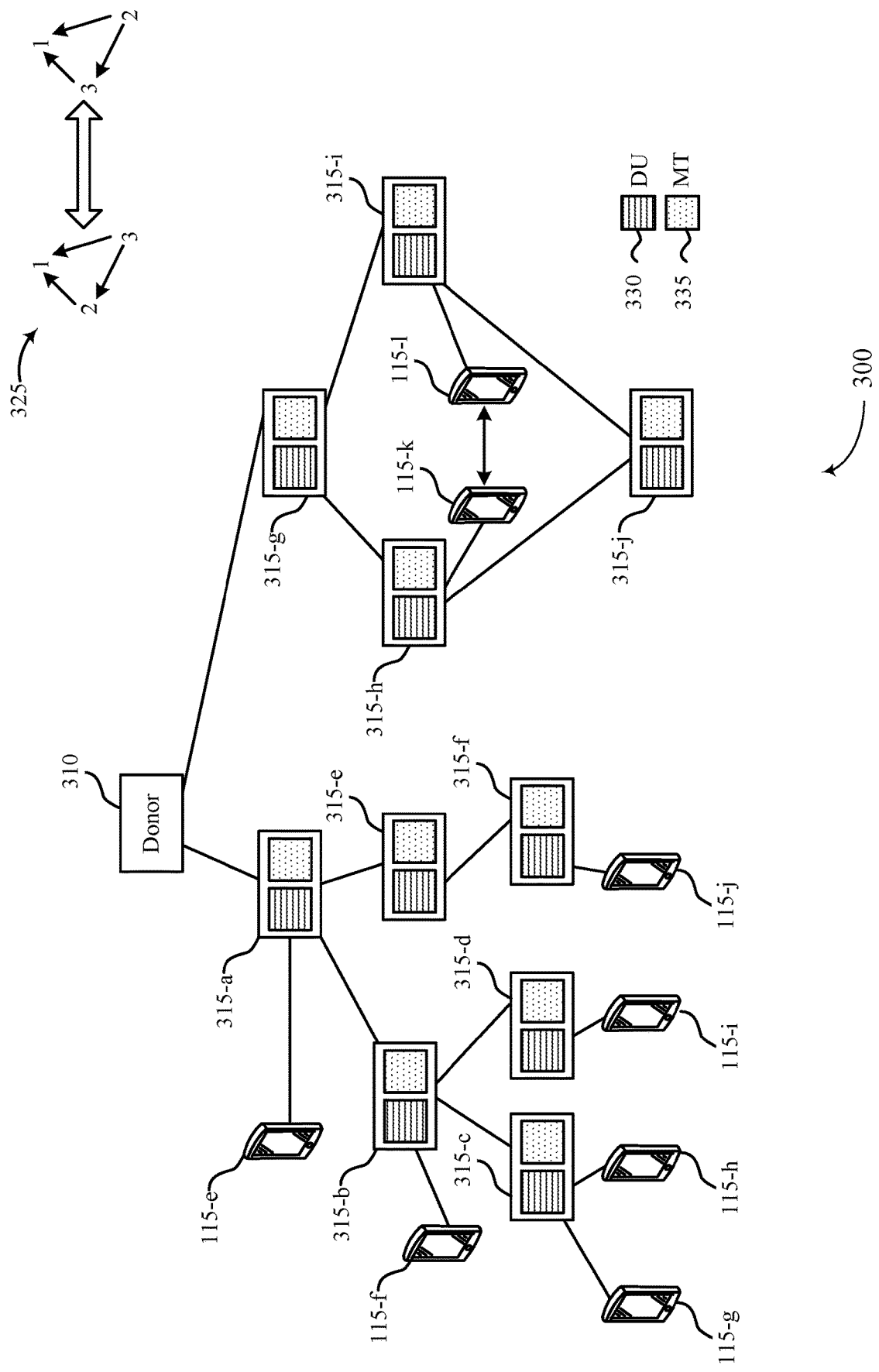
FIG. 3 illustrates an example of a network that supports integrated access and backhaul sidelink communications in accordance with aspects of the present disclosure.

FIG. 3 illustrates an example of a network 300 that supports integrated access and backhaul sidelink communications in accordance with aspects of the present disclosure. The network 300 includes an IAB donor 310, which may be an example of the IAB donor 210 described with respect to FIG. 2. The network also includes a number of IAB nodes 315, which may be examples of the IAB nodes 215 described with respect to FIG. 2. The IAB nodes 315 are illustrated as including a DU 330 and an MT 335. It should be understood that the IAB nodes may include sidelink functionality (e.g., sidelink functionality 235 of FIG. 2) that is separate from the DU 330 and MT 335 or integrated with one or both of the DU 330 and MT 335. The network 300 further includes a set of UEs 115, which may be examples of the UEs 115 described with respect to FIGS. 1 and 2.

One or more of the IAB nodes 315 may support sidelink communications. As such, the sidelink capable IAB nodes 315 may communicate with other sidelink capable IAB nodes 315. This sidelink communication may support richer topology discovery because additional connections may be established between IAB nodes, which may improve reliability and load balancing by restricting routes in the network to sidelink. An additional benefit of IAB nodes 315 communicating via sidelink interface may be that IAB nodes 315 may communicate with each other directly via DU to DU communications, thus allowing neighboring DUs (e.g., nodes that share the same parent) to communicate and coordinate. It should be understood that these implementations support communications between IAB nodes 315 having various relationships including parent to child, cousin to cousin, siblings, grandparent to grandchild. More particularly, the IAB nodes 315 may communicate without dependence on the topology of the network 300. Further, the sidelink communications between IAB nodes 315-c may be used to facilitate or manage sidelink communications between DUs. For example, IAB nodes 315-c and 315-d may communicate over a sidelink connection to facilitate a sidelink connection being established between UE 115-h and UE 115-i.

Thus, according to techniques described herein, a first IAB node 315 may communicate with a second IAB node 315 using sidelink functionality. In some cases, the first IAB node 315 and the second IAB node 315 may share the same CU (e.g., CU 220 of FIG. 2), or the first and second IAB nodes may be supported by different CUs. Further, if the first and second IAB nodes share the same CU, then the second IAB node 315 may be a parent, ancestor, child, descendent, sibling, or cousin node of the first IAB node 315.

To support DU to DU communications, the sidelink functionality may be integrated with the DUs of the IAB nodes 315. Communication between DUs (e.g., via a sidelink interface established between the DUs 330, without an intermediate node or component such as CU or MT) may be referred to as inter-DU protocol or communication, which may support topology adaptation. For example, if the topology of the network is to be changed, due to various conditions such as mobility of IAB nodes 315 and/or UEs 115 within the network 300 or a link failure, local coordination via the sidelink interface may support efficient topology adaptation.

In one example utilization of the techniques described herein, IAB nodes 315-c and 315-d are child nodes of the same parent node 315-b. These IAB nodes 315 may be performing a topology adaptation due to various circumstances such as mobility or link failure, and as such, the IAB node 315-c and 315-d may communicate over the sidelink to determine which of the IAB nodes 315-c and 315-d is to function as the parent IAB node 315 as the other IAB node 315 (or which is the child). This example is further illustrated in topology adoption example 325, where IAB nodes illustrated by the numbers 1, 2, and 3 communicate to determine whether IAB node (2) is to relay communications from IAB node (3) or whether IAB node (3) is to relay communications from IAB node (2). Further, the sidelink connection may be used to relay the traffic between the IAB node (2) and IAB (3).

Figure 4:
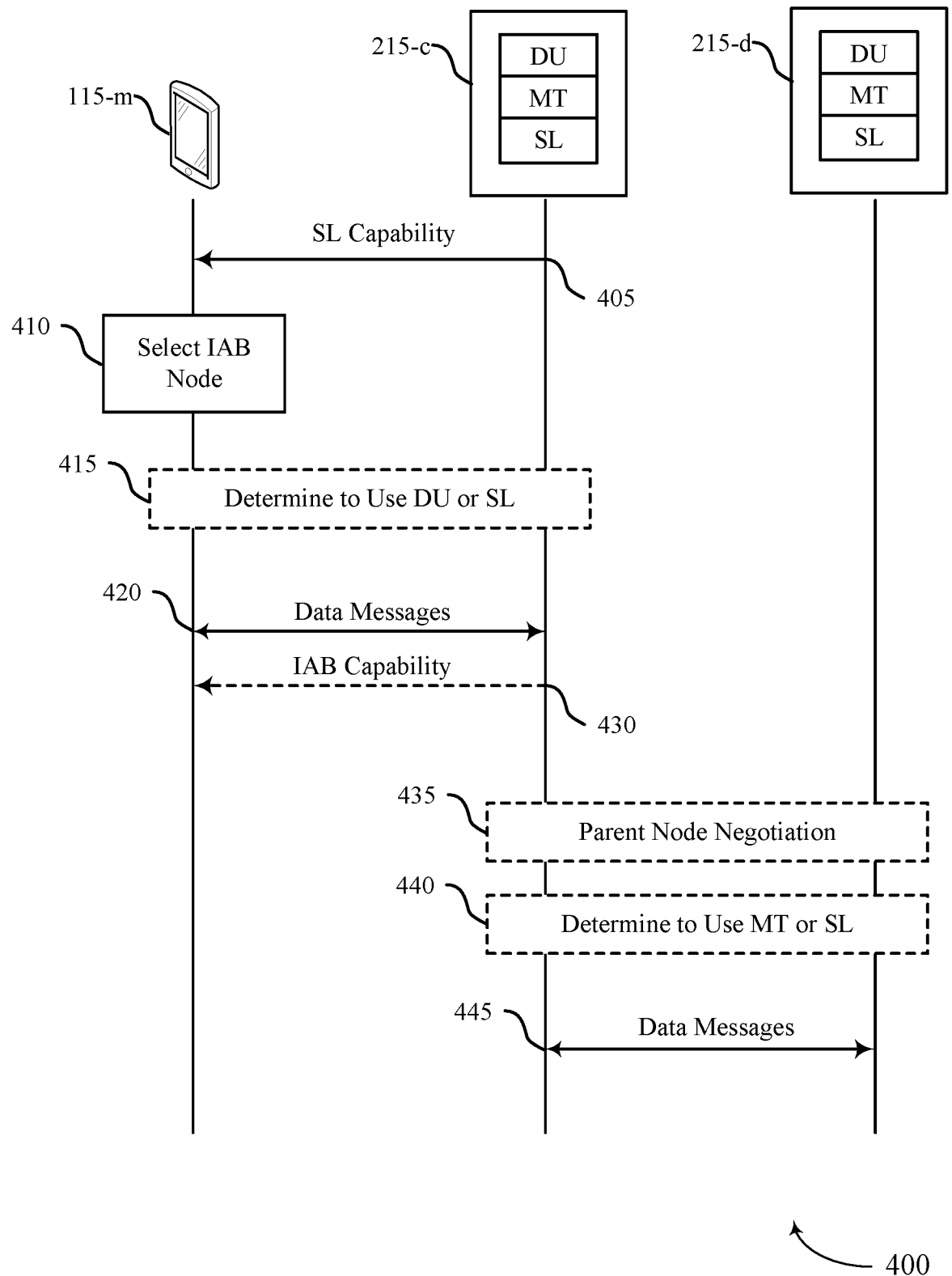
FIG. 4 illustrates an example of a process flow diagram that supports integrated access and backhaul sidelink communications in accordance with aspects of the present disclosure.

FIG. 4 illustrates an example of a process flow diagram 400 that supports integrated access and backhaul sidelink communications in accordance with aspects of the present disclosure. The process flow diagram 400 incudes IAB nodes 215-c and 215-d and a UE 115-m, which may be examples of the corresponding devices as described with respect to FIGS. 1 through 3. The IAB nodes 215-c and 215-d may support sidelink functionality.

At 405, the UE 115-m may receive, from the IAB node 215-c, an indication that the IAB node 215-c supports sidelink communications. The indication may be received over a downlink channel. (e.g., a Uu connection). In some examples, the indication is in a MIB or SIB or in an RRC message. The indication may be implicit or explicit. In some cases, the indication is in the form of a QCL relationship indication between two reference signals (e.g., a reference signal associated with the DU of the IB node 15-c and a reference signal associated with the sidelink functionality of the IAB node 215). In some cases, the UE 115-m may receive an indication that the IAB node supports UE to UE and/or UE to network relay capability.

At 410, the UE 115-m may select the IAB node 215-c to relay communications between the first UE 115-m and a second wireless node (e.g., a second UE 115, another IAB node, an IAB-donor, or a base station) based at least in part on the indication that the IAB node supports sidelink communications. In some cases, the UE 115-m may select the IAB node 215-c for relaying based on an indication received from the IAB node 215-c, another network node, or a CU.

At 415, the UE 115-m and the IAB node 215-c may determine to use the DU of the IAB node 215-c or the sidelink functionality of the IAB node 215-c for relaying the communications. The determination may be based on the mobility state of the UE 115-m, the mobility sate of the IAB node 215-c, or both. In some cases, the IAB node 215-c, another network node, or a CU may indicate that the UE 115-m and the IAB node 215-c are to use the DU or the sidelink functionality for relaying.

At 420, the UE 115-m communicate one or more data message with the second UE via the IAB node 215-c in accordance with selecting the IAB node 215-c to relay the communications.

At 425, the UE 115-m may receive, from the IAB node 215-c on a sidelink connection established between the UE 115-m and the IAB node 215-c, an indication that the IAB node 215-c supports IAB functionality.

At 435, the IAB node 215-c and the IAB node 215-d may determine whether the IAB node 215-c is to be a parent node of the second IAB node 215-d or whether the second IAB node 215-d is to be a parent node of the IAB node 215-c. This operation may be a parent node negotiation procedure.

At 440, the IAB node 215-c and the IAB node 215-d may determine to use the MT or sidelink functionality for communications. The determination may be based on the mobility state of the parent IAB node 215-d and/or the mobility state of the IAB node 215-c. In some cases, the IAB node 215-c and/or the IAB node 215-c may receive an instruction to use the MT or sidelink functionality from another IAB node 215 or a CU.

At 445, the IAB node 215-c and the IAB node 215-d may communicate one or more data messages over the sidelink or the Uu link established between the IAB node 215-c and the IAB node 215-d.

In some cases, the IAB node 215-c may communicate with the UE 115-m over a sidelink connection and communicate with another UE 115 over a downlink connection. These used connections may be based on the mobility state of the IAB node 215-c relative to the UE 115-m and the other UE 115. For example, the UE 115 may be in a vehicle serviced by the IAB node 215-c (e.g., the IAB node 215-c travels with the vehicle) and thus may be serviced using the Uu connection. Further, the UE 115-m may be outside the vehicle (e.g., not traveling with the vehicle) and thus may be serviced by the sidelink functionality due to sidelink being optimized for high mobility environments.

Figure 5:
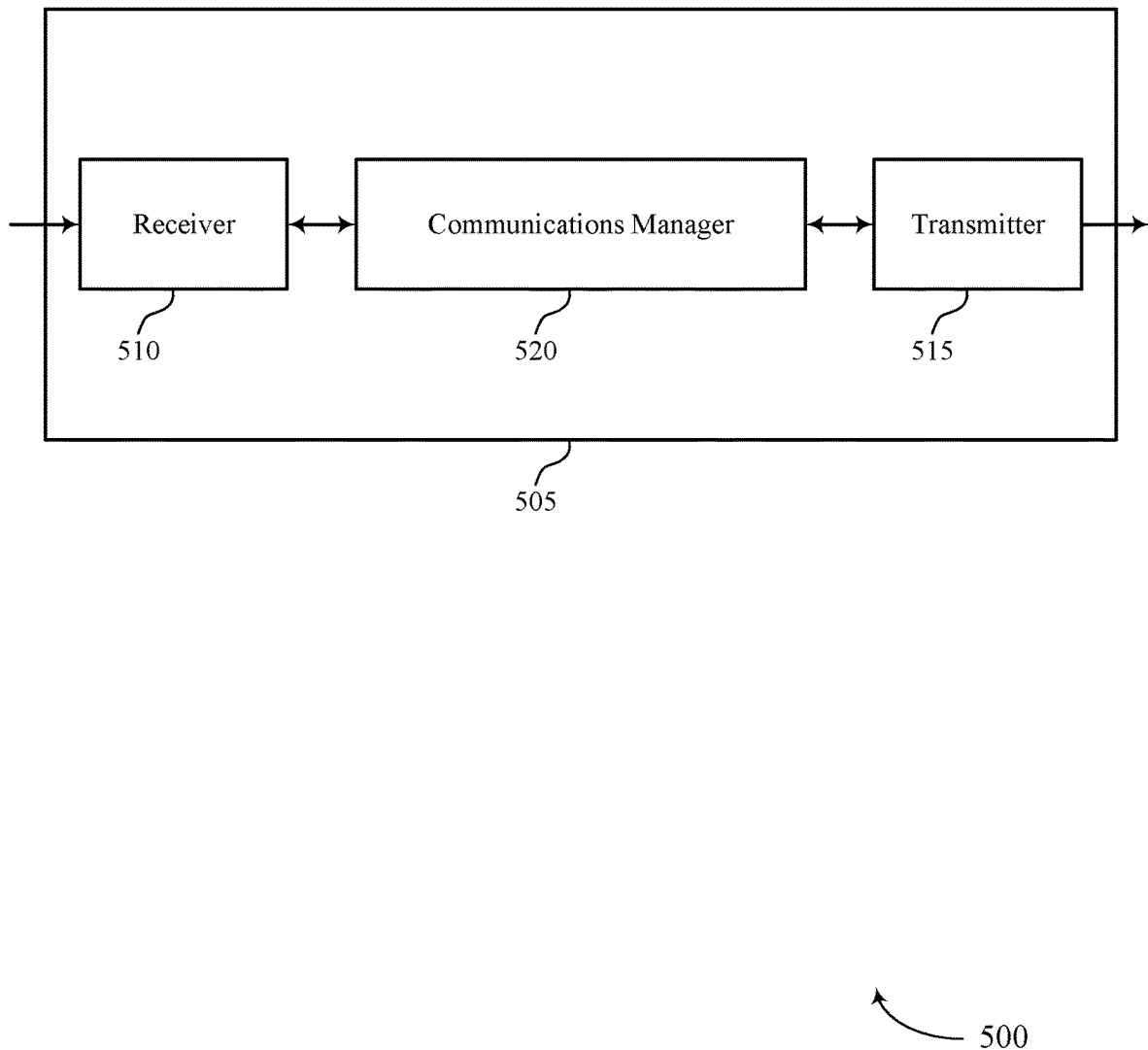
FIGS. 5 and 6 show block diagrams of devices that support integrated access and backhaul sidelink communications in accordance with aspects of the present disclosure.

FIG. 5 shows a block diagram 500 of a device 505 that supports integrated access and backhaul sidelink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to integrated access and backhaul sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to integrated access and backhaul sidelink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of integrated access and backhaul sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, from an integrated access and backhaul (IAB) node, an indication that the IAB node supports sidelink communications. The communications manager 520 may be configured as or otherwise support a means for selecting the IAB node to relay communications between the first UE and a second wireless node based on the indication that the IAB node supports sidelink communications. The communications manager 520 may be configured as or otherwise support a means for communicating one or more data messages with the second wireless node via the IAB node in accordance with the selecting of the IAB node to relay the communications.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources by allocating some communications to sidelink resources, which may reduce processing overhead in various scenarios.

Figure 6:
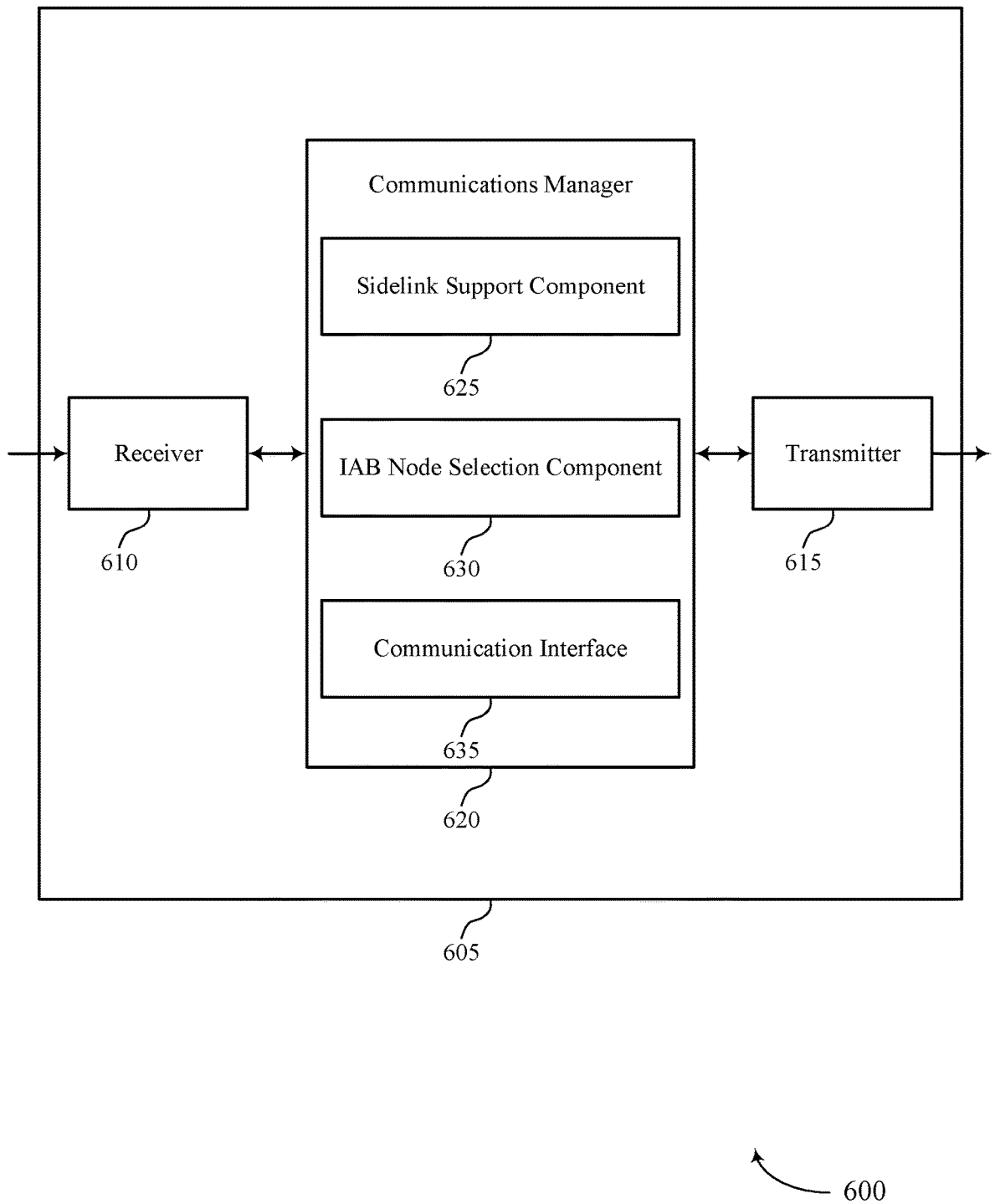

FIG. 6 shows a block diagram 600 of a device 605 that supports integrated access and backhaul sidelink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to integrated access and backhaul sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to integrated access and backhaul sidelink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of integrated access and backhaul sidelink communications as described herein. For example, the communications manager 620 may include a sidelink support component 625, an IAB node selection component 630, a communication interface 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The sidelink support component 625 may be configured as or otherwise support a means for receiving, from an integrated access and backhaul (IAB) node, an indication that the IAB node supports sidelink communications. The IAB node selection component 630 may be configured as or otherwise support a means for selecting the IAB node to relay communications between the first UE and a second wireless node based on the indication that the IAB node supports sidelink communications. The communication interface 635 may be configured as or otherwise support a means for communicating one or more data messages with the second wireless node via the IAB node in accordance with the selecting of the IAB node to relay the communications.

Figure 7:
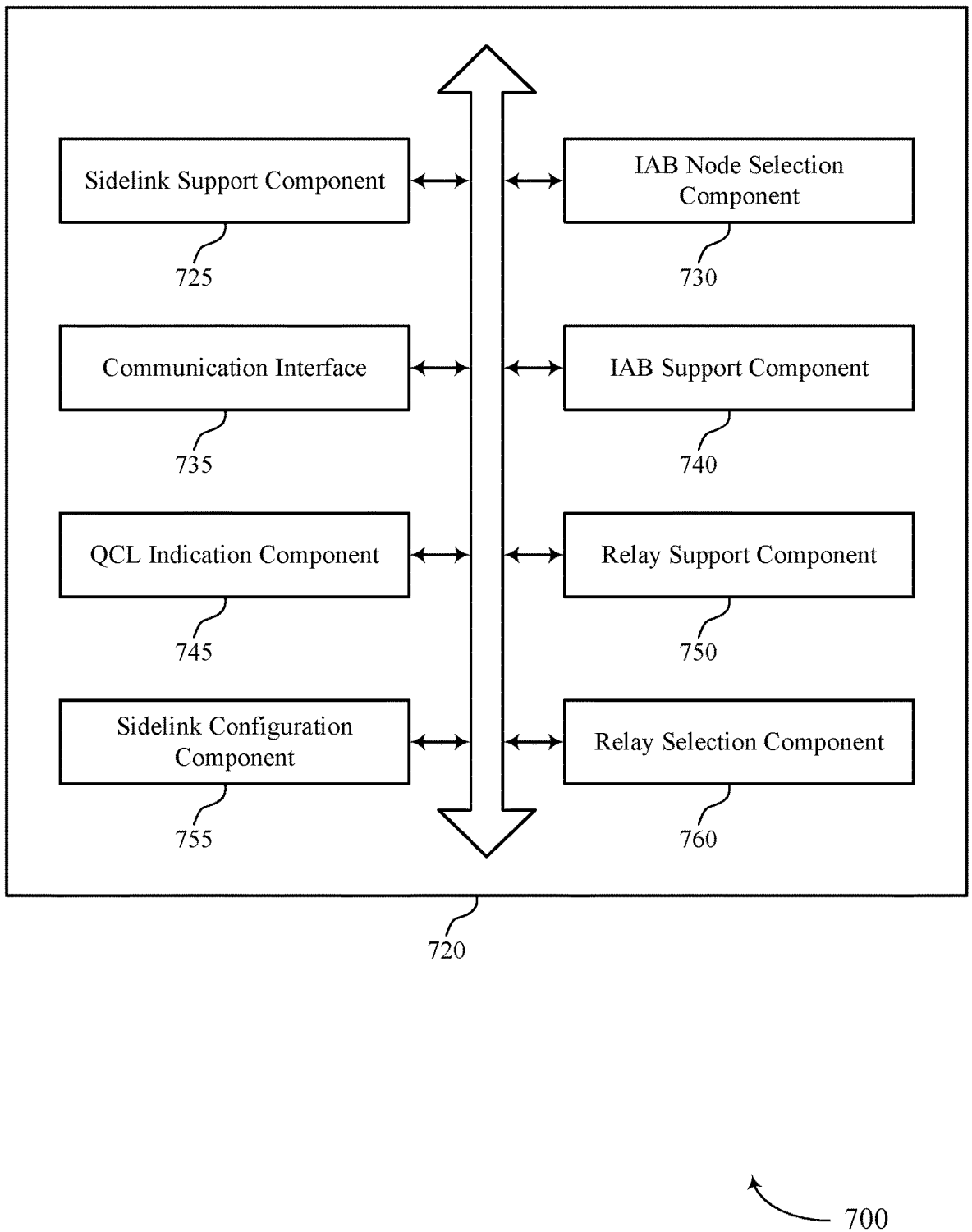
FIG. 7 shows a block diagram of a communications manager that supports integrated access and backhaul sidelink communications in accordance with aspects of the present disclosure.

FIG. 7 shows a block diagram 700 of a communications manager 720 that supports integrated access and backhaul sidelink communications in accordance with aspects of the present disclosure. The communications manager 720 may be an example of aspects of a communications manager 520, a communications manager 620, or both, as described herein. The communications manager 720, or various components thereof, may be an example of means for performing various aspects of integrated access and backhaul sidelink communications as described herein. For example, the communications manager 720 may include a sidelink support component 725, an IAB node selection component 730, a communication interface 735, an IAB support component 740, a QCL indication component 745, a relay support component 750, a sidelink configuration component 755, a relay selection component 760, or any combination thereof. Each of these components may communicate, directly or indirectly, with one another (e.g., via one or more buses).

The communications manager 720 may support wireless communication at a first UE in accordance with examples as disclosed herein. The sidelink support component 725 may be configured as or otherwise support a means for receiving, from an integrated access and backhaul (IAB) node, an indication that the IAB node supports sidelink communications. The IAB node selection component 730 may be configured as or otherwise support a means for selecting the IAB node to relay communications between the first UE and a second wireless node based on the indication that the IAB node supports sidelink communications. The communication interface 735 may be configured as or otherwise support a means for communicating one or more data messages with the second wireless node via the IAB node in accordance with the selecting of the IAB node to relay the communications.

In some examples, to support receiving the indication that the IAB node supports sidelink communications, the sidelink support component 725 may be configured as or otherwise support a means for receiving the indication from a distributed unit of the IAB node.

In some examples, the IAB support component 740 may be configured as or otherwise support a means for receiving, on a sidelink connection established between the first UE and the IAB node, an indication that the IAB node supports IAB functionality.

In some examples, to support receiving the indication that the IAB node supports sidelink communications, the QCL indication component 745 may be configured as or otherwise support a means for receiving, from the IAB node, an indication of a quasi co-location relationship between a downlink reference signal corresponding to a distributed unit of the IAB node and a sidelink reference signal corresponding to sidelink functionality of the IAB node, where the downlink reference signal is a downlink synchronization signal block or a downlink channel state information reference signal and the sidelink reference signal is a sidelink synchronization signal block or a sidelink channel state information reference signal. In some examples, to support receiving the indication that the IAB node supports sidelink communications, the sidelink support component 725 may be configured as or otherwise support a means for determining that the IAB node supports the sidelink communications based on the indication of the quasi co-location relationship.

In some examples, to support receiving the indication of the quasi co-location relationship, the QCL indication component 745 may be configured as or otherwise support a means for receiving the indication of the quasi co-location relationship over a radio resource control connection with the distributed unit of the IAB node, a sidelink connection established with the IAB node, or both the radio resource control connection and the sidelink connection.

In some examples, the relay support component 750 may be configured as or otherwise support a means for receiving an indication that specifies that the IAB node supports UE to UE relay communications, UE to network relay communications, or both.

In some examples, the sidelink configuration component 755 may be configured as or otherwise support a means for receiving, from the IAB node via a sidelink connection or in a downlink message from the IAB node, configuration information that the first UE is to use for communications with the IAB node, where the first UE communicates the one or more data messages in accordance with the configuration information and where the configuration information includes one or more cell identities, frequency information, system information, a cell-barred state of a distributed unit of the IAB node, child support information of the distributed unit of the IAB node, a time domain duplexing configuration, a slot status of a slot of a cell, transmission reception point information of the IAB node, a mobility state of the IAB node, or any combination thereof.

In some examples, the sidelink configuration component 755 may be configured as or otherwise support a means for receiving, from the IAB node via a downlink message, sidelink resource configuration information that the first UE is to use for communications with the IAB node via sidelink functionality of the IAB node, wherein the first UE communicates with the second wireless node via the sidelink functionality of the IAB node based at least in part on the sidelink resource configuration information.

In some examples, to support selecting the IAB node, the relay selection component 760 may be configured as or otherwise support a means for determining to use a distributed unit of the IAB node or sidelink functionality of the IAB node to relay the one or more data messages between the first UE and the second wireless node.

In some examples, to support determining to use the distributed unit or the sidelink functionality, the relay selection component 760 may be configured as or otherwise support a means for selecting the distributed unit or the sidelink functionality or receiving an indication that the UE is to use the distributed unit or the sidelink functionality from the IAB node, a central unit, or another network node.

In some examples, to support determining to use the distributed unit or the sidelink functionality, the relay selection component 760 may be configured as or otherwise support a means for determining to use the distributed unit or the sidelink functionality based on a mobility state of the UE, a mobility state of the IAB node, or both.

In some examples, to support receiving the indication that the IAB node supports sidelink communications, the sidelink support component 725 may be configured as or otherwise support a means for receiving the indication via radio resource control signaling, in a master information block, or in a system information block.

Figure 8:
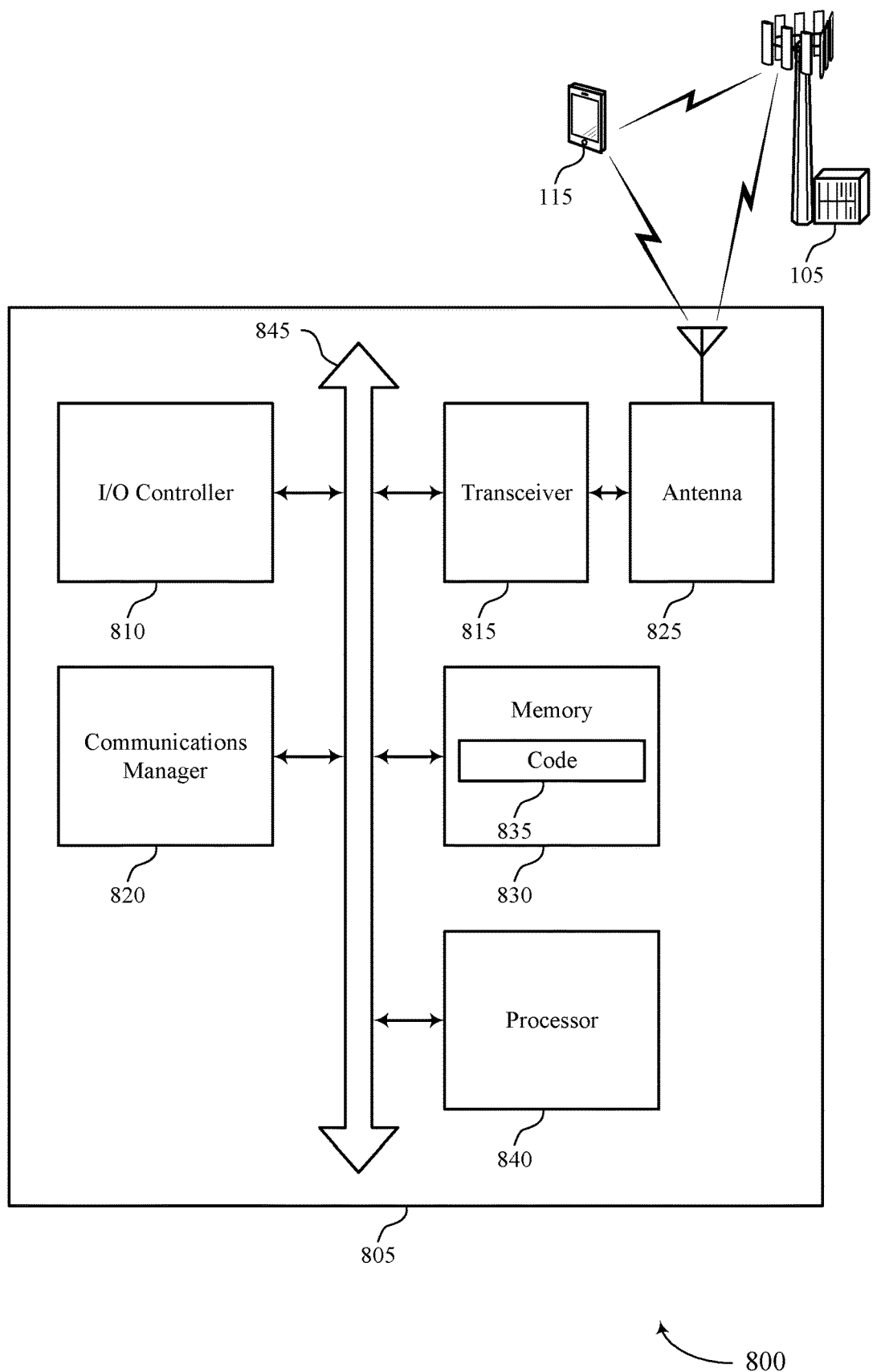
FIG. 8 shows a diagram of a system including a device that supports integrated access and backhaul sidelink communications in accordance with aspects of the present disclosure.

FIG. 8 shows a diagram of a system 800 including a device 805 that supports integrated access and backhaul sidelink communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting integrated access and backhaul sidelink communications). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, from an integrated access and backhaul (IAB) node, an indication that the IAB node supports sidelink communications. The communications manager 820 may be configured as or otherwise support a means for selecting the IAB node to relay communications between the first UE and a second wireless node based on the indication that the IAB node supports sidelink communications. The communications manager 820 may be configured as or otherwise support a means for communicating one or more data messages with the second wireless node via the IAB node in accordance with the selecting of the IAB node to relay the communications.

By including or configuring the communications manager 820 in accordance with examples as described herein, the device 805 may support techniques for more efficient utilization of communication resources and improved coordination between devices by leveraging sidelink functionality, which may offload coordination overhead from a base station device.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of integrated access and backhaul sidelink communications as described herein, or the processor 840 and the memory 830 may be otherwise configured to perform or support such operations.

Figure 9:
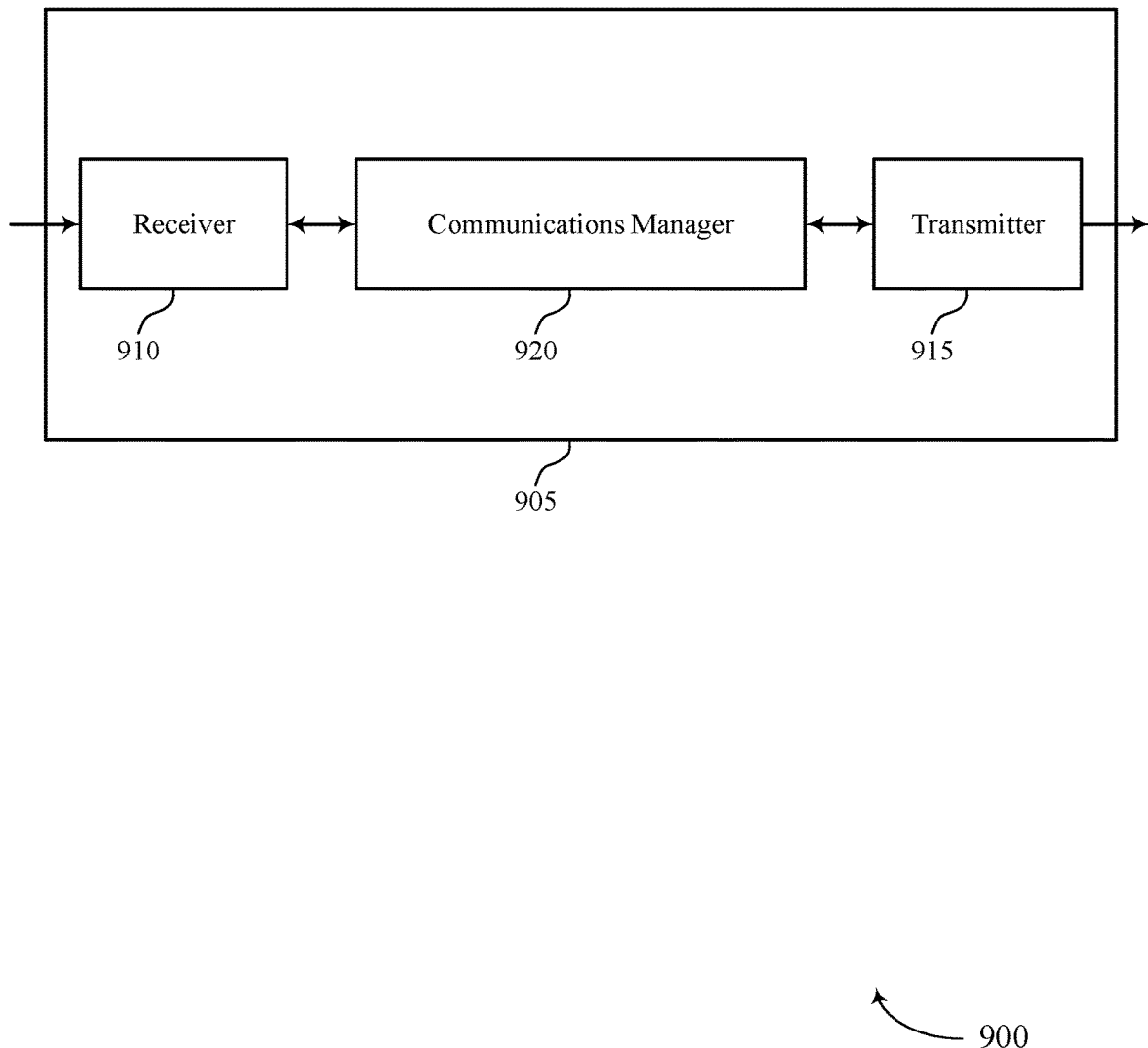
FIGS. 9 and 10 show block diagrams of devices that support integrated access and backhaul sidelink communications in accordance with aspects of the present disclosure.

FIG. 9 shows a block diagram 900 of a device 905 that supports integrated access and backhaul sidelink communications in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to integrated access and backhaul sidelink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to integrated access and backhaul sidelink communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of integrated access and backhaul sidelink communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at an integrated access and backhaul (IAB) node in accordance with examples as disclosed herein. For example, the communications manager 920 may be configured as or otherwise support a means for transmitting an indication that the IAB node supports sidelink communications, where the IAB node includes a mobile termination unit and a distributed unit. The communications manager 920 may be configured as or otherwise support a means for establishing a sidelink connection with a peer node according to the transmitted indication. The communications manager 920 may be configured as or otherwise support a means for communicating one or more data messages with the peer node over the established sidelink connection.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources by allocating some communications to sidelink resources, which may reduce processing overhead in various scenarios.

Figure 10:
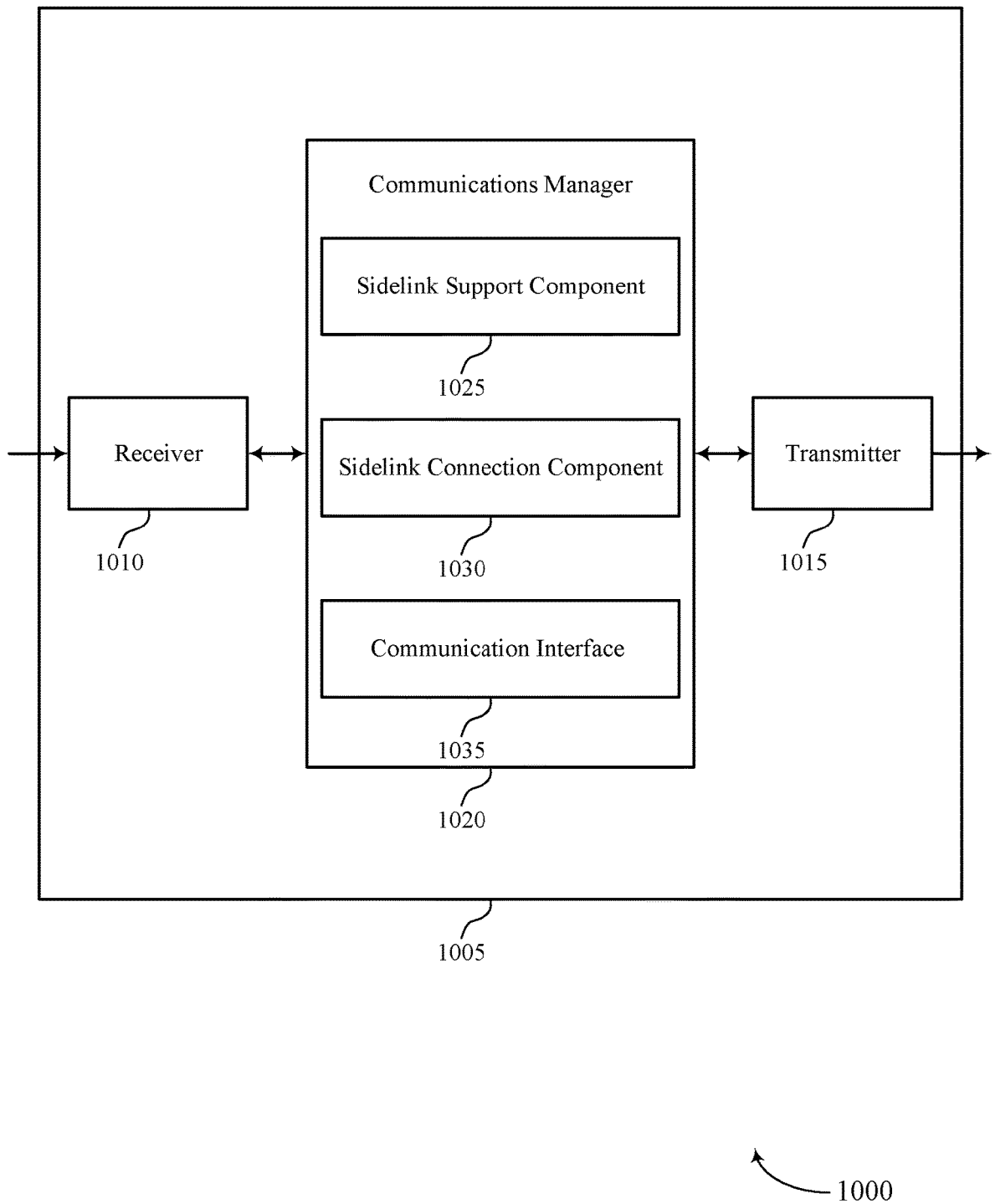

FIG. 10 shows a block diagram 1000 of a device 1005 that supports integrated access and backhaul sidelink communications in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to integrated access and backhaul sidelink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to integrated access and backhaul sidelink communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of integrated access and backhaul sidelink communications as described herein. For example, the communications manager 1020 may include a sidelink support component 1025, a sidelink connection component 1030, a communication interface 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at an integrated access and backhaul (IAB) node in accordance with examples as disclosed herein. The sidelink support component 1025 may be configured as or otherwise support a means for transmitting an indication that the IAB node supports sidelink communications, where the IAB node includes a mobile termination unit and a distributed unit. The sidelink connection component 1030 may be configured as or otherwise support a means for establishing a sidelink connection with a peer node according to the transmitted indication. The communication interface 1035 may be configured as or otherwise support a means for communicating one or more data messages with the peer node over the established sidelink connection.

Figure 11:
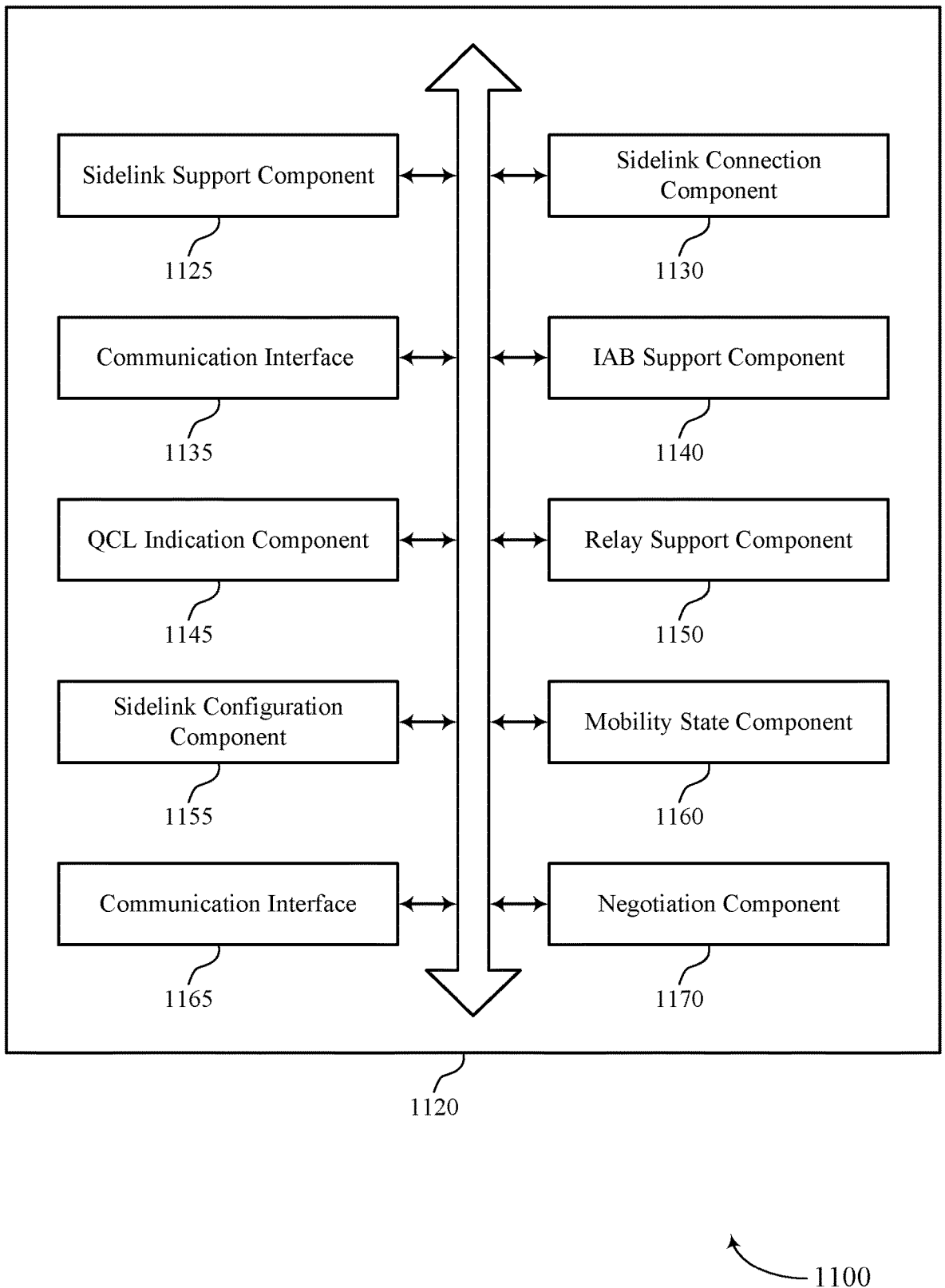
FIG. 11 shows a block diagram of a communications manager that supports integrated access and backhaul sidelink communications in accordance with aspects of the present disclosure.

FIG. 11 shows a block diagram 1100 of a communications manager 1120 that supports integrated access and backhaul sidelink communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of integrated access and backhaul sidelink communications as described herein. For example, the communications manager 1120 may include a sidelink support component 1125, a sidelink connection component 1130, a communication interface 1135, an IAB support component 1140, a QCL indication component 1145, a relay support component 1150, a sidelink configuration component 1155, a mobility state component 1160, a communication interface 1165, a negotiation component 1170, or any combination thereof. Each of these components may communicate, directly or indirectly, with one another (e.g., via one or more buses).

The communications manager 1120 may support wireless communication at an integrated access and backhaul (IAB) node in accordance with examples as disclosed herein. The sidelink support component 1125 may be configured as or otherwise support a means for transmitting an indication that the IAB node supports sidelink communications, where the IAB node includes a mobile termination unit and a distributed unit. The sidelink connection component 1130 may be configured as or otherwise support a means for establishing a sidelink connection with a peer node according to the transmitted indication. The communication interface 1135 may be configured as or otherwise support a means for communicating one or more data messages with the peer node over the established sidelink connection.

In some examples, to support transmitting the indication that the IAB node supports sidelink communications, the sidelink support component 1125 may be configured as or otherwise support a means for transmitting the indication via the distributed unit of the IAB node.

In some examples, the IAB support component 1140 may be configured as or otherwise support a means for transmitting, via the sidelink connection an indication that the IAB node supports IAB functionality.

In some examples, to support transmitting the indication, the QCL indication component 1145 may be configured as or otherwise support a means for transmitting an indication of a quasi co-location relationship between a downlink reference signal corresponding to the distributed unit of the IAB node and a sidelink reference signal corresponding to sidelink functionality of the IAB node, where the downlink reference signal is a downlink synchronization signal block or a downlink channel state information reference signal and the sidelink reference signal is a sidelink synchronization signal block or a sidelink channel state information reference signal.

In some examples, to support transmitting the indication of the quasi co-location relationship, the QCL indication component 1145 may be configured as or otherwise support a means for transmitting the indication of the quasi co-location relationship over a radio resource control connection between the distributed unit and the peer node, the sidelink connection established with the peer node, or both the radio resource control connection and the sidelink connection.

In some examples, the relay support component 1150 may be configured as or otherwise support a means for transmitting an indication that specifies that the IAB node supports UE to UE relay communications, UE to network relay communications, or both.

In some examples, the peer node is a UE, and the sidelink configuration component 1155 may be configured as or otherwise support a means for transmitting, to the UE via the sidelink connection, configuration information that the peer node is to use for communications with the IAB node, where the configuration information includes one or more cell identities, frequency information, system information, a cell-barred state of the distributed unit of the IAB node, child support information of the distributed unit of the IAB node, a time domain duplexing configuration, a slot status of a slot of a cell, transmission reception point information of the IAB node, a mobility state of the IAB node, or any combination thereof.

In some examples, the sidelink configuration component 1155 may be configured as or otherwise support a means for transmitting, to the peer node via a downlink message, sidelink resource configuration information that the peer node is to use for communications with the IAB node via the sidelink functionality of the IAB node, wherein the peer node is a UE or a second IAB node.

In some examples, the sidelink configuration component 1155 may be configured as or otherwise support a means for determining to use the distributed unit or sidelink functionality for communications with the peer node or receiving an indication that the IAB node is to use the distributed unit or the sidelink functionality from a second IAB node or a central unit.

In some examples, the mobility state component 1160 may be configured as or otherwise support a means for communicating with the first UE using the sidelink connection based on a first mobility state of the first UE relative to the IAB node. In some examples, the mobility state component 1160 may be configured as or otherwise support a means for communicating with a second UE using the distributed unit based on a second mobility state of the second UE relative to the IAB node.

In some examples, the mobility state component 1160 may be configured as or otherwise support a means for communicating with a distributed unit of a parent IAB node of the IAB node using the mobile termination unit of the IAB node or a sidelink functionality of the IAB node based on a mobility state of the parent IAB node.

In some examples, the negotiation component 1170 may be configured as or otherwise support a means for determining whether the IAB node is to be a parent node of the second IAB node or whether the second IAB node is to be a parent node of the IAB node.

In some examples, the IAB node and the second IAB node share a same central unit.

In some examples, the communication interface 1165 may be configured as or otherwise support a means for communicating between the distributed unit of the IAB node and a distributed unit of the second IAB node over the sidelink connection.

In some examples, to support transmitting the indication that the IAB node supports sidelink communications, the sidelink support component 1125 may be configured as or otherwise support a means for transmitting the indication via radio resource control signaling, in a master information block, or in a system information block.

Figure 12:
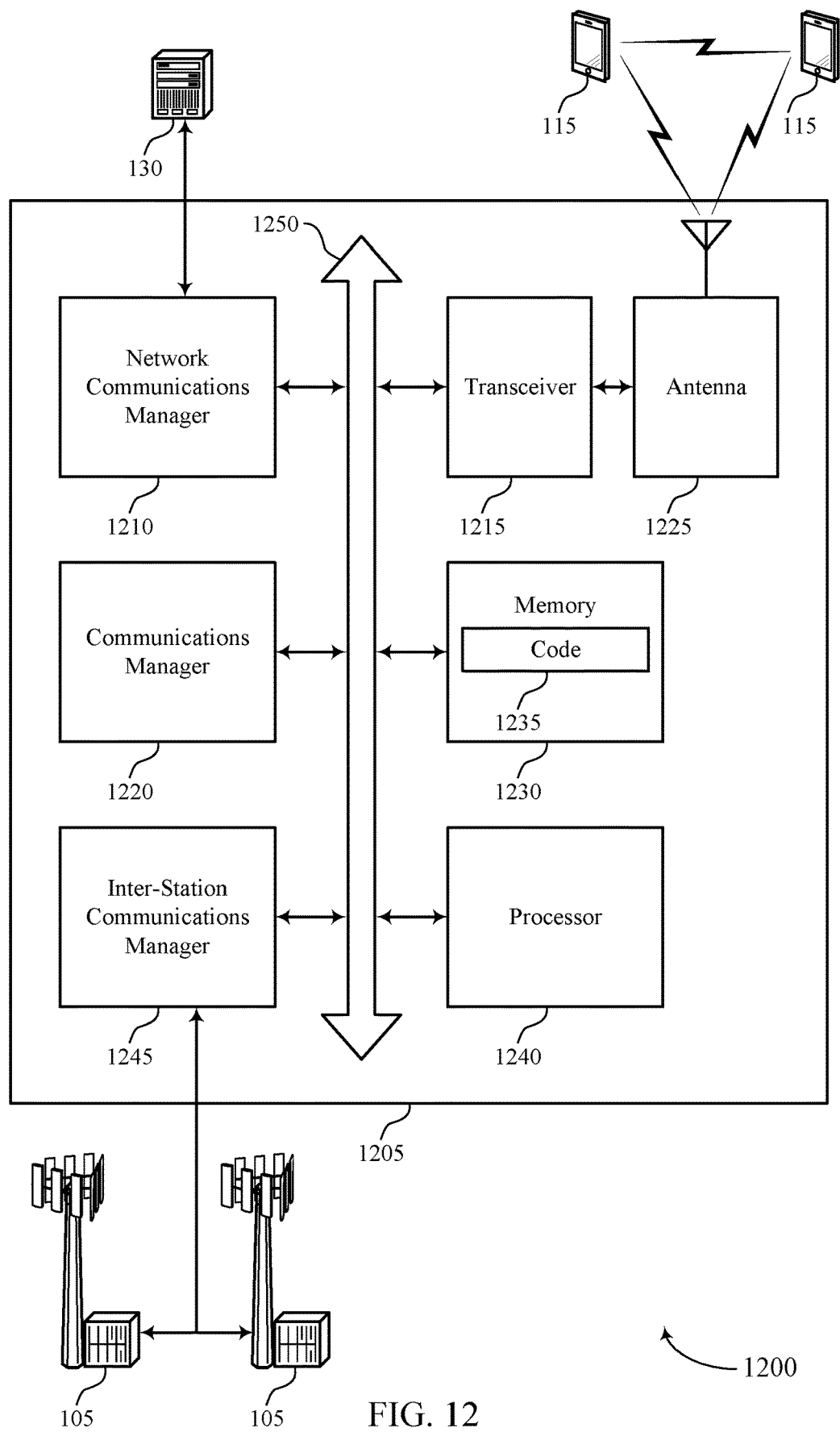
FIG. 12 shows a diagram of a system including a device that supports integrated access and backhaul sidelink communications in accordance with aspects of the present disclosure.

FIG. 12 shows a diagram of a system 1200 including a device 1205 that supports integrated access and backhaul sidelink communications in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting integrated access and backhaul sidelink communications). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at an integrated access and backhaul (IAB) node in accordance with examples as disclosed herein. For example, the communications manager 1220 may be configured as or otherwise support a means for transmitting an indication that the IAB node supports sidelink communications, where the IAB node includes a mobile termination unit and a distributed unit. The communications manager 1220 may be configured as or otherwise support a means for establishing a sidelink connection with a peer node according to the transmitted indication. The communications manager 1220 may be configured as or otherwise support a means for communicating one or more data messages with the peer node over the established sidelink connection.

By including or configuring the communications manager 1220 in accordance with examples as described herein, the device 1205 may support techniques for improved coordination between devices by leveraging sidelink functionality, which may offload coordination overhead from a base station devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of integrated access and backhaul sidelink communications as described herein, or the processor 1240 and the memory 1230 may be otherwise configured to perform or support such operations.

Figure 13:
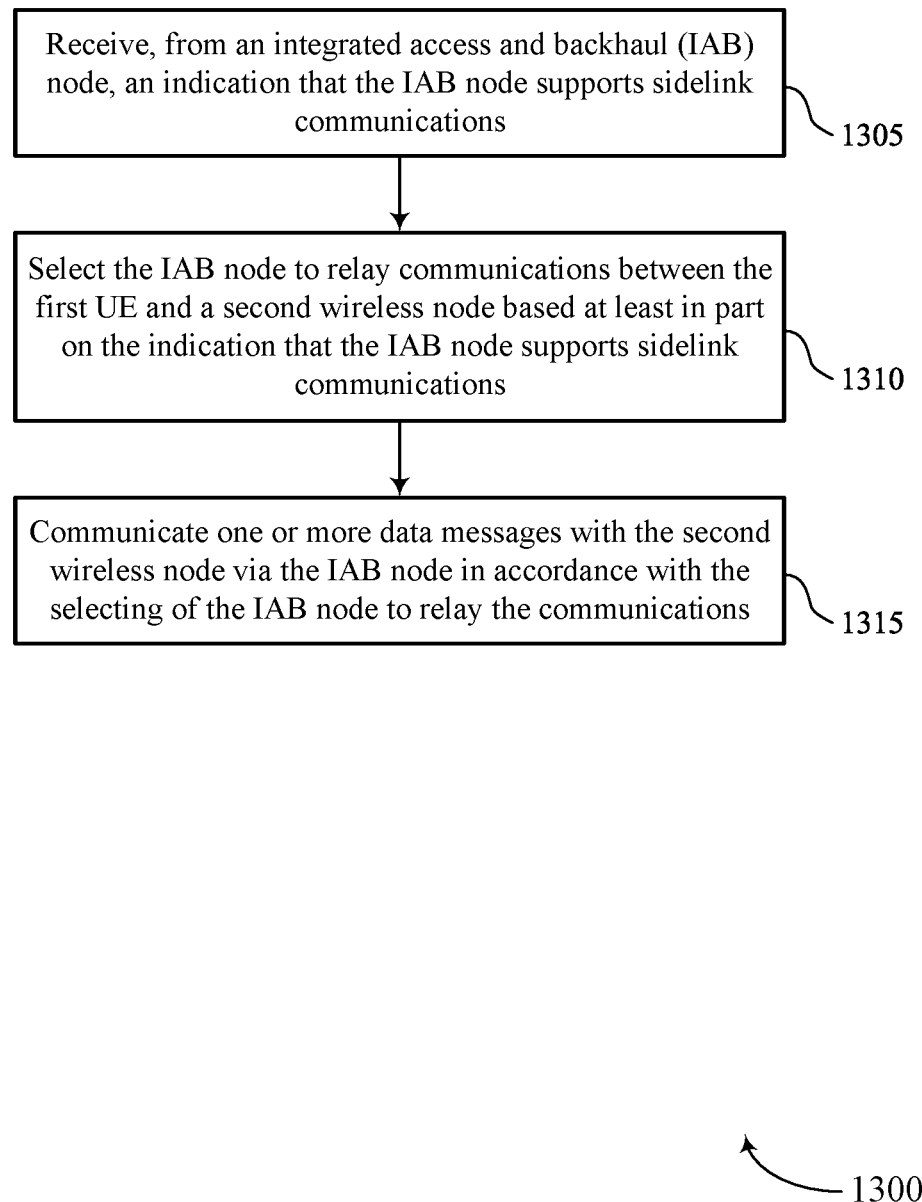
FIGS. 13 through 16 show flowcharts illustrating methods that support integrated access and backhaul sidelink communications in accordance with aspects of the present disclosure.

FIG. 13 shows a flowchart illustrating a method 1300 that supports integrated access and backhaul sidelink communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from an integrated access and backhaul (IAB) node, an indication that the IAB node supports sidelink communications. The operations of 1305 may be performed in accordance with examples as disclosed herein. In some examples, aspects of the operations of 1305 may be performed by a sidelink support component 725 as described with reference to FIG. 7.

At 1310, the method may include selecting the IAB node to relay communications between the first UE and a second wireless node based on the indication that the IAB node supports sidelink communications. The operations of 1310 may be performed in accordance with examples as disclosed herein. In some examples, aspects of the operations of 1310 may be performed by an IAB node selection component 730 as described with reference to FIG. 7.

At 1315, the method may include communicating one or more data messages with the second wireless node via the IAB node in accordance with the selecting of the IAB node to relay the communications. The operations of 1315 may be performed in accordance with examples as disclosed herein.

In some examples, aspects of the operations of 1315 may be performed by a communication interface 735 as described with reference to FIG. 7.

Figure 14:
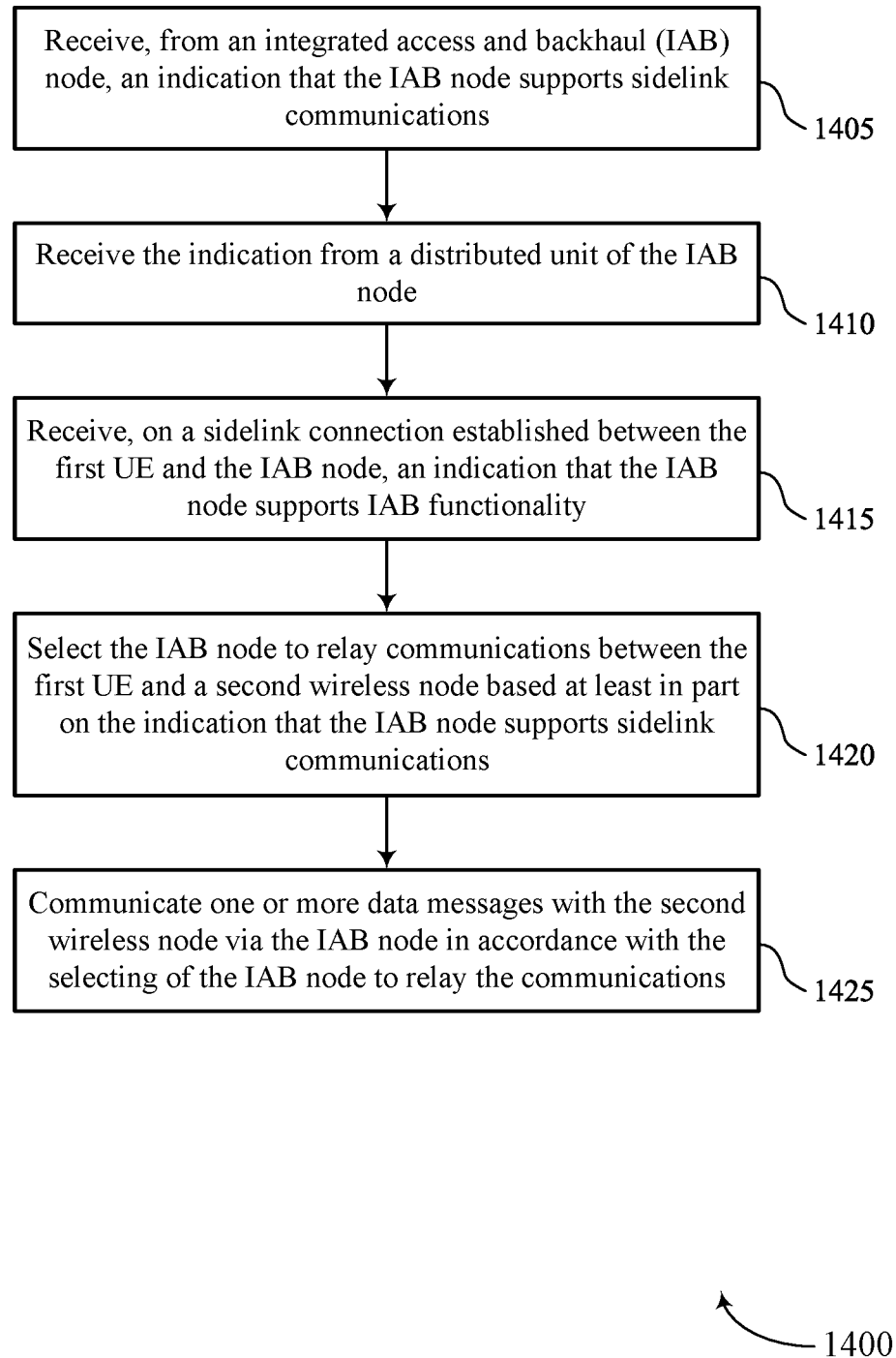

FIG. 14 shows a flowchart illustrating a method 1400 that supports integrated access and backhaul sidelink communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from an integrated access and backhaul (IAB) node, an indication that the IAB node supports sidelink communications. The operations of 1405 may be performed in accordance with examples as disclosed herein. In some examples, aspects of the operations of 1405 may be performed by a sidelink support component 725 as described with reference to FIG. 7.

At 1410, the method may include receiving the indication from a distributed unit of the IAB node. The operations of 1410 may be performed in accordance with examples as disclosed herein. In some examples, aspects of the operations of 1410 may be performed by a sidelink support component 725 as described with reference to FIG. 7.

At 1415, the method may include receiving, on a sidelink connection established between the first UE and the IAB node, an indication that the IAB node supports IAB functionality. The operations of 1415 may be performed in accordance with examples as disclosed herein. In some examples, aspects of the operations of 1415 may be performed by an IAB support component 740 as described with reference to FIG. 7.

At 1420, the method may include selecting the IAB node to relay communications between the first UE and a second wireless node based on the indication that the IAB node supports sidelink communications. The operations of 1420 may be performed in accordance with examples as disclosed herein. In some examples, aspects of the operations of 1420 may be performed by an IAB node selection component 730 as described with reference to FIG. 7.

At 1425, the method may include communicating one or more data messages with the second wireless node via the IAB node in accordance with the selecting of the IAB node to relay the communications. The operations of 1425 may be performed in accordance with examples as disclosed herein. In some examples, aspects of the operations of 1425 may be performed by a communication interface 735 as described with reference to FIG. 7.

Figure 15:
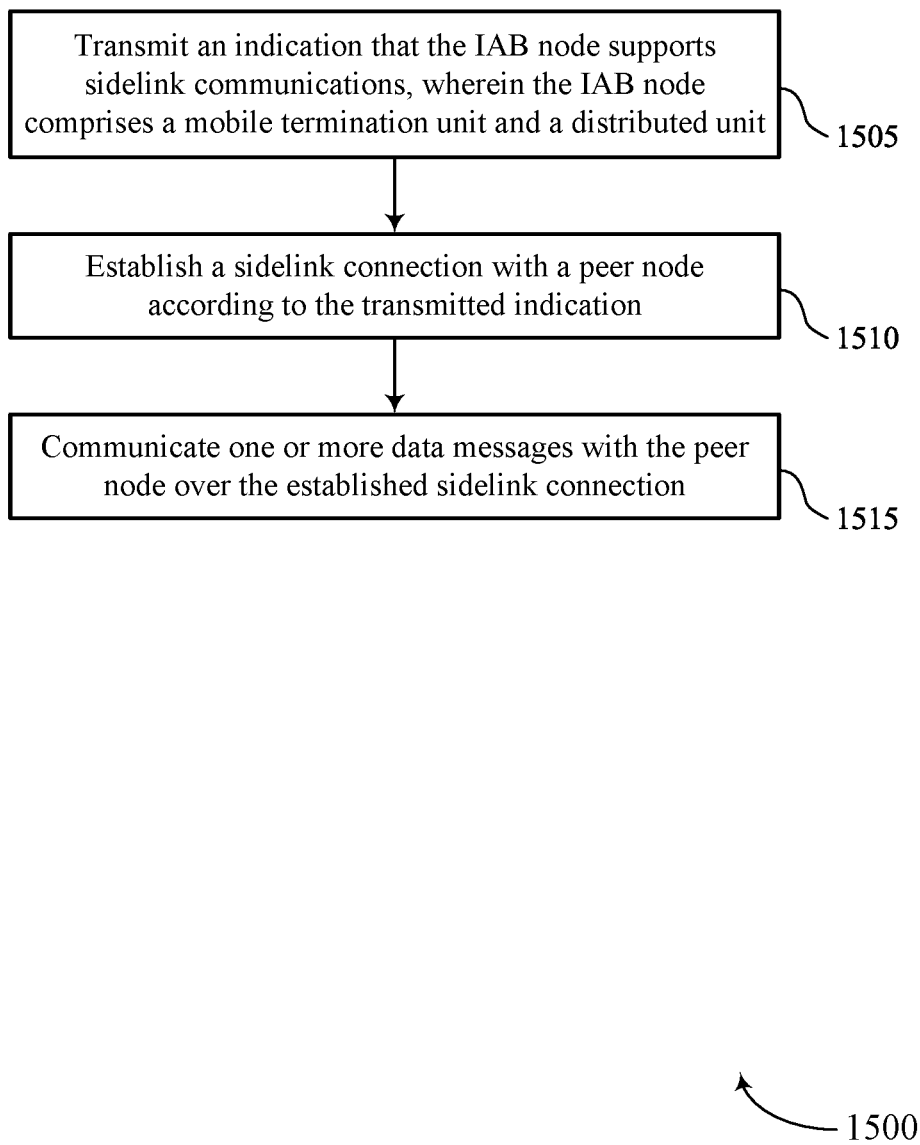

FIG. 15 shows a flowchart illustrating a method 1500 that supports integrated access and backhaul sidelink communications in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting an indication that the IAB node supports sidelink communications, where the IAB node includes a mobile termination unit and a distributed unit. The operations of 1505 may be performed in accordance with examples as disclosed herein. In some examples, aspects of the operations of 1505 may be performed by a sidelink support component 1125 as described with reference to FIG. 11.

At 1510, the method may include establishing a sidelink connection with a peer node according to the transmitted indication. The operations of 1510 may be performed in accordance with examples as disclosed herein. In some examples, aspects of the operations of 1510 may be performed by a sidelink connection component 1130 as described with reference to FIG. 11.

At 1515, the method may include communicating one or more data messages with the peer node over the established sidelink connection. The operations of 1515 may be performed in accordance with examples as disclosed herein. In some examples, aspects of the operations of 1515 may be performed by a communication interface 1135 as described with reference to FIG. 11.

Figure 16:
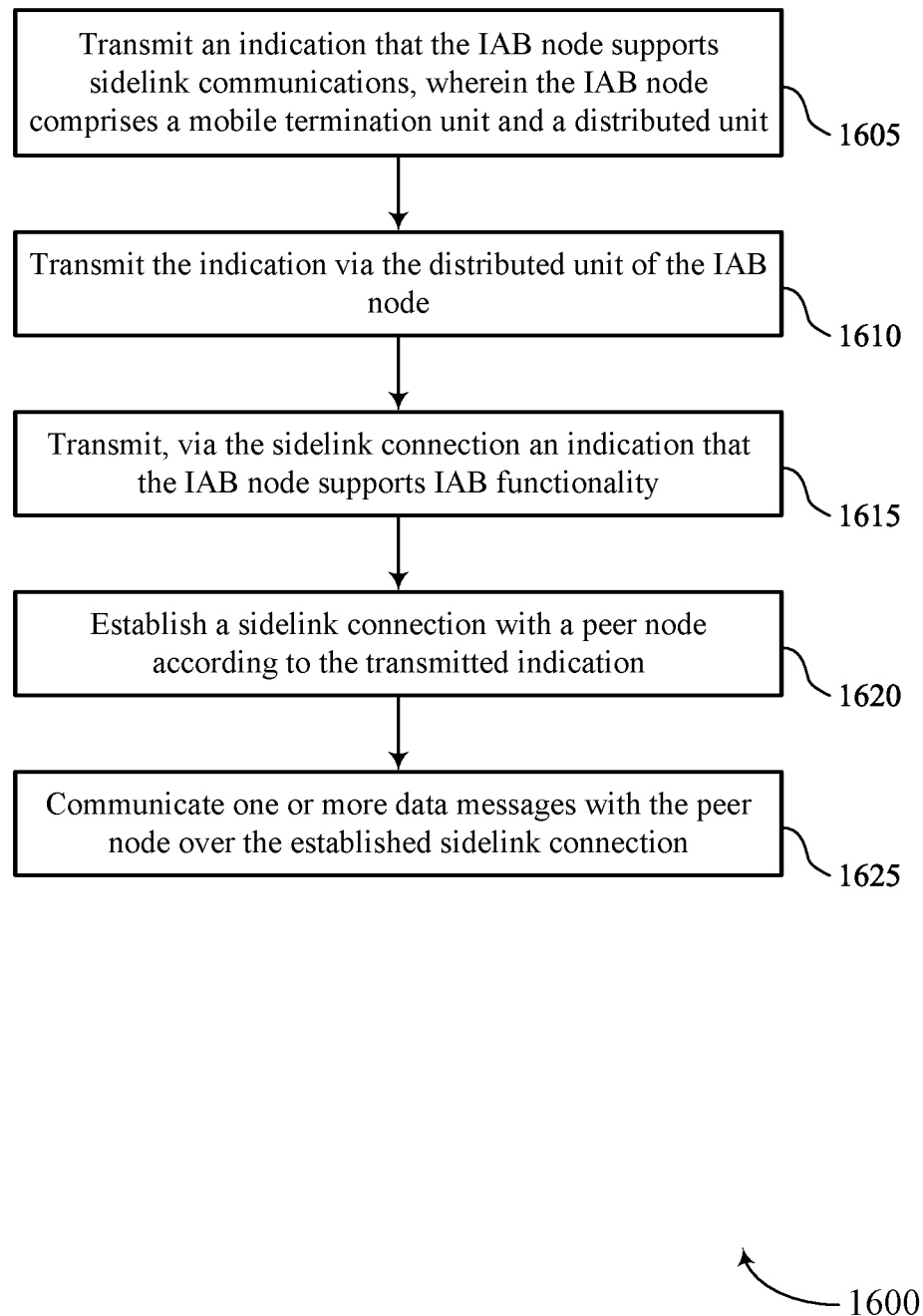

FIG. 16 shows a flowchart illustrating a method 1600 that supports integrated access and backhaul sidelink communications in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting an indication that the IAB node supports sidelink communications, where the IAB node includes a mobile termination unit and a distributed unit. The operations of 1605 may be performed in accordance with examples as disclosed herein. In some examples, aspects of the operations of 1605 may be performed by a sidelink support component 1125 as described with reference to FIG. 11.

At 1610, the method may include transmitting the indication via the distributed unit of the IAB node. The operations of 1610 may be performed in accordance with examples as disclosed herein. In some examples, aspects of the operations of 1610 may be performed by a sidelink support component 1125 as described with reference to FIG. 11.

At 1615, the method may include transmitting, via the sidelink connection an indication that the IAB node supports IAB functionality. The operations of 1615 may be performed in accordance with examples as disclosed herein. In some examples, aspects of the operations of 1615 may be performed by an IAB support component 1140 as described with reference to FIG. 11.

At 1620, the method may include establishing a sidelink connection with a peer node according to the transmitted indication. The operations of 1620 may be performed in accordance with examples as disclosed herein. In some examples, aspects of the operations of 1620 may be performed by a sidelink connection component 1130 as described with reference to FIG. 11.

At 1625, the method may include communicating one or more data messages with the peer node over the established sidelink connection. The operations of 1625 may be performed in accordance with examples as disclosed herein. In some examples, aspects of the operations of 1625 may be performed by a communication interface 1135 as described with reference to FIG. 11.

The following provides an overview of aspects of the present disclosure:

Aspect 1: A method for wireless communication at a first UE, comprising: receiving, from an integrated access and backhaul (IAB) node, an indication that the IAB node supports sidelink communications; selecting the IAB node to relay communications between the first UE and a second wireless node based at least in part on the indication that the IAB node supports sidelink communications; and communicating one or more data messages with the second wireless node via the IAB node in accordance with the selecting of the IAB node to relay the communications.

Aspect 2: The method of aspect 1, wherein receiving the indication that the IAB node supports sidelink communications comprises: receiving the indication from a distributed unit of the IAB node.

Aspect 3: The method of any of aspects 1 through 2, further comprising: receiving, on a sidelink connection established between the first UE and the IAB node, an indication that the IAB node supports IAB functionality.

Aspect 4: The method of any of aspects 1 through 3, wherein receiving the indication that the IAB node supports sidelink communications comprises: receiving, from the IAB node, an indication of a quasi-co-location relationship between a downlink reference signal corresponding to a distributed unit of the IAB node and a sidelink reference signal corresponding to sidelink functionality of the IAB node, wherein the downlink reference signal is a downlink synchronization signal block or a downlink channel state information reference signal and the sidelink reference signal is a sidelink synchronization signal block or a sidelink channel state information reference signal, wherein the first UE communicates with the second wireless node based at least in part on the indication of the quasi co-location relationship.

Aspect 5: The method of aspect 4, wherein receiving the indication of the quasi co-location relationship comprises: receiving the indication of the quasi co-location relationship over a radio resource control connection with the distributed unit of the IAB node, a sidelink connection established with the IAB node, or both the radio resource control connection and the sidelink connection.

Aspect 6: The method of any of aspects 1 through 5, further comprising: receiving an indication that specifies that the IAB node supports UE to UE relay communications, UE to network relay communications, or both.

Aspect 7: The method of any of aspects 1 through 6, further comprising: receiving, from the IAB node via a sidelink connection, configuration information that the first UE is to use for communications with the IAB node, wherein the first UE communicates the one or more data messages in accordance with the configuration information and wherein the configuration information comprises one or more cell identities, frequency information, system information, a cell-barred state of a distributed unit of the IAB node, child support information of the distributed unit of the IAB node, a time domain duplexing configuration, a slot status of a slot of a cell, transmission reception point information of the IAB node, a mobility state of the IAB node, or any combination thereof.

Aspect 8: The method of any of aspects 1 through 7, further comprising: receiving, from the IAB node via a downlink message, sidelink resource configuration information that the first UE is to use for communications with the IAB node via sidelink functionality of the IAB node, wherein the first UE communicates with the second wireless node via the sidelink functionality of the IAB node based at least in part on the sidelink resource configuration information.

Aspect 9: The method of any of aspects 1 through 8, wherein selecting the IAB node comprises: determining to use a distributed unit of the IAB node or sidelink functionality of the IAB node to relay the one or more data messages between the first UE and the second wireless node.

Aspect 10: The method of aspect 9, wherein determining to use the distributed unit or the sidelink functionality comprises: selecting the distributed unit or the sidelink functionality or receiving an indication that the UE is to use the distributed unit or the sidelink functionality from the IAB node, a central unit, or another network node.

Aspect 11: The method of any of aspects 9 through 10, wherein determining to use the distributed unit or the sidelink functionality comprises: determining to use the distributed unit or the sidelink functionality based at least in part on a mobility state of the UE, a mobility state of the IAB node, or both.

Aspect 12: The method of any of aspects 1 through 11, wherein the second wireless node is a second UE, a second IAB node, an IAB-donor, or a base station.

Aspect 13: The method of any of aspects 1 through 12, wherein receiving the indication that the IAB node supports sidelink communications comprises: receiving the indication via radio resource control signaling, in a master information block, or in a system information block.

Aspect 14: A method for wireless communication at an integrated access and backhaul (IAB) node, comprising: transmitting an indication that the IAB node supports sidelink communications, wherein the IAB node comprises a mobile termination unit and a distributed unit; establishing a sidelink connection with a peer node according to the transmitted indication; and communicating one or more data messages with the peer node over the established sidelink connection.

Aspect 15: The method of aspect 14, wherein transmitting the indication that the IAB node supports sidelink communications comprises: transmitting the indication via the distributed unit of the IAB node.

Aspect 16: The method of aspect 14, further comprising: transmitting, via the sidelink connection an indication that the IAB node supports IAB functionality.

Aspect 17: The method of any of aspects 14 through 16, wherein transmitting the indication comprises: transmitting an indication of a quasi co-location relationship between a downlink reference signal corresponding to the distributed unit of the IAB node and a sidelink reference signal corresponding to sidelink functionality of the IAB node, wherein the downlink reference signal is a downlink synchronization signal block or a downlink channel state information reference signal and the sidelink reference signal is a sidelink synchronization signal block or a sidelink channel state information reference signal.

Aspect 18: The method of aspect 17, wherein transmitting the indication of the quasi co-location relationship comprises: transmitting the indication of the quasi co-location relationship over a radio resource control connection between the distributed unit and the peer node, the sidelink connection established with the peer node, or both the radio resource control connection and the sidelink connection.

Aspect 19: The method of any of aspects 14 through 18, further comprising: transmitting an indication that specifies that the IAB node supports UE to UE relay communications, UE to network relay communications, or both.

Aspect 20: The method of any of aspects 14 through 19, wherein the peer node is a UE, the method further comprising: transmitting, to the UE via the sidelink connection, configuration information that the peer node is to use for communications with the IAB node, wherein the configuration information comprises one or more cell identities, frequency information, system information, a cell-barred state of the distributed unit of the IAB node, child support information of the distributed unit of the IAB node, a time domain duplexing configuration, a slot status of a slot of a cell, transmission reception point information of the IAB node, a mobility state of the IAB node, or any combination thereof.

Aspect 21: The method of any of aspects 14 through 19, wherein the peer node is a UE, the method further comprising: transmitting, to the peer node via a downlink message, sidelink resource configuration information that the peer node is to use for communications with the IAB node via the sidelink functionality of the IAB node, wherein the peer node is a UE or a second IAB node.

Aspect 22: The method of any of aspects 14 through 21, further comprising: determining to use the distributed unit or sidelink functionality for communications with the peer node or receiving an indication that the IAB node is to use the distributed unit or the sidelink functionality from a second IAB node or a central unit.

Aspect 23: The method of any of aspects 14 through 22, wherein the peer node is a first UE, further comprising: communicating with the first UE using the sidelink connection based at least in part on a first mobility state of the first UE relative to the IAB node; and communicating with a second UE using the distributed unit based at least in part on a second mobility state of the second UE relative to the IAB node.

Aspect 24: The method of any of aspects 14 through 23, further comprising: communicating with a distributed unit of a parent IAB node of the IAB node using the mobile termination unit of the IAB node or a sidelink functionality of the IAB node based at least in part on a mobility state of the parent IAB node.

Aspect 25: The method of aspect 24, further comprising: determining whether the IAB node is to be a parent node of the second IAB node or whether the second IAB node is to be a parent node of the IAB node.

Aspect 26: The method of any of aspects 24 through 25, wherein the IAB node and the second IAB node share a same central unit.

Aspect 27: The method of any of aspects 14 through 26, wherein the peer node is a second IAB node, further comprising: communicating between the distributed unit of the IAB node and a distributed unit of the second IAB node over the sidelink connection.

Aspect 28: The method of any of aspects 14 through 27, wherein transmitting the indication that the IAB node supports sidelink communications comprises: transmitting the indication via radio resource control signaling, in a master information block, or in a system information block.

Aspect 29: An apparatus for wireless communication at a first UE, comprising a processor; memory coupled with the processor; and instructions stored in the memory and executable by the processor to cause the apparatus to perform a method of any of aspects 1 through 13.

Aspect 30: An apparatus for wireless communication at a first UE, comprising at least one means for performing a method of any of aspects 1 through 13.

Aspect 31: A non-transitory computer-readable medium storing code for wireless communication at a first UE, the code comprising instructions executable by a processor to perform a method of any of aspects 1 through 13.

Aspect 32: An apparatus for wireless communication at an integrated access and backhaul (IAB) node, comprising a processor; memory coupled with the processor; and instructions stored in the memory and executable by the processor to cause the apparatus to perform a method of any of aspects 14 through 28.

Aspect 33: An apparatus for wireless communication at an integrated access and backhaul (IAB) node, comprising at least one means for performing a method of any of aspects 14 through 28.

Aspect 34: A non-transitory computer-readable medium storing code for wireless communication at an integrated access and backhaul (IAB) node, the code comprising instructions executable by a processor to perform a method of any of aspects 14 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, from an integrated access and backhaul (IAB) node, an indication that the IAB node supports sidelink communications;
   selecting the IAB node to relay communications between the first UE and a second wireless node based at least in part on the indication that the IAB node supports sidelink communications; and
   communicating one or more data messages with the second wireless node via the IAB node in accordance with the selecting of the IAB node to relay the communications.

2. The method of claim 1, wherein receiving the indication that the IAB node supports sidelink communications comprises:
   receiving the indication from a distributed unit of the IAB node.

3. The method of claim 1, further comprising:
   receiving, on a sidelink connection established between the first UE and the IAB node, an indication that the IAB node supports IAB functionality.

4. The method of claim 1, wherein receiving the indication that the IAB node supports sidelink communications comprises:
   receiving, from the IAB node, an indication of a quasi co-location relationship between a downlink reference signal corresponding to a distributed unit of the IAB node and a sidelink reference signal corresponding to sidelink functionality of the IAB node, wherein the downlink reference signal is a downlink synchronization signal block or a downlink channel state information reference signal and the sidelink reference signal is a sidelink synchronization signal block or a sidelink channel state information reference signal, wherein the first UE communicates with the second wireless node based at least in part on the indication of the quasi co-location relationship.

5. The method of claim 4, wherein receiving the indication of the quasi co-location relationship comprises:
   receiving the indication of the quasi co-location relationship over a radio resource control connection with the distributed unit of the IAB node, a sidelink connection established with the IAB node, or both the radio resource control connection and the sidelink connection.

6. The method of claim 1, further comprising:
receiving an indication that specifies that the IAB node supports UE to UE relay communications, UE to network relay communications, or both.

7. The method of claim 1, further comprising:
receiving, from the IAB node via a sidelink connection, configuration information that the first UE is to use for communications with the IAB node, wherein the first UE communicates the one or more data messages in accordance with the configuration information and wherein the configuration information comprises one or more cell identities, frequency information, system information, a cell-barred state of a distributed unit of the IAB node, child support information of the distributed unit of the IAB node, a time domain duplexing configuration, a slot status of a slot of a cell, transmission reception point information of the IAB node, a mobility state of the IAB node, or any combination thereof.

8. The method of claim 1, further comprising:
receiving, from the IAB node via a downlink message, sidelink resource configuration information that the first UE is to use for communications with the IAB node via sidelink functionality of the IAB node, wherein the first UE communicates with the second wireless node via the sidelink functionality of the IAB node based at least in part on the sidelink resource configuration information.

9. The method of claim 1, wherein selecting the IAB node comprises:
determining to use a distributed unit of the IAB node or sidelink functionality of the IAB node to relay the one or more data messages between the first UE and the second wireless node.

10. The method of claim 1, wherein the second wireless node is a second UE, a second IAB node, an IAB-donor, or a base station.

11. The method of claim 9, wherein determining to use the distributed unit or the sidelink functionality comprises:
selecting the distributed unit or the sidelink functionality or receiving an indication that the UE is to use the distributed unit or the sidelink functionality from the IAB node, a central unit, or another network node.

12. The method of claim 9, wherein determining to use the distributed unit or the sidelink functionality comprises:
determining to use the distributed unit or the sidelink functionality based at least in part on a mobility state of the UE, a mobility state of the IAB node, or both.

13. The method of claim 1, wherein receiving the indication that the IAB node supports sidelink communications comprises:
receiving the indication via radio resource control signaling, in a master information block, or in a system information block.

14. A method for wireless communication at an integrated access and backhaul (IAB) node, comprising:
transmitting an indication that the IAB node supports sidelink communications, wherein the IAB node comprises a mobile termination unit and a distributed unit;
establishing a sidelink connection with a peer node according to the transmitted indication; and
communicating one or more data messages with the peer node over the established sidelink connection.

15. The method of claim 14, wherein transmitting the indication that the IAB node supports sidelink communications comprises:
transmitting the indication via the distributed unit of the IAB node.

16. The method of claim 14, further comprising:
transmitting, via the sidelink connection an indication that the IAB node supports IAB functionality.

17. The method of claim 14, wherein transmitting the indication comprises:
transmitting an indication of a quasi co-location relationship between a downlink reference signal corresponding to the distributed unit of the IAB node and a sidelink reference signal corresponding to sidelink functionality of the IAB node, wherein the downlink reference signal is a downlink synchronization signal block or a downlink channel state information reference signal and the sidelink reference signal is a sidelink synchronization signal block or a sidelink channel state information reference signal.

18. The method of claim 17, wherein transmitting the indication of the quasi co-location relationship comprises:
transmitting the indication of the quasi co-location relationship over a radio resource control connection between the distributed unit and the peer node, the sidelink connection established with the peer node, or both the radio resource control connection and the sidelink connection.

19. The method of claim 14, further comprising:
transmitting an indication that specifies that the IAB node supports UE to UE relay communications, UE to network relay communications, or both.

20. The method of claim 14, wherein the peer node is a user equipment (UE), the method further comprising:
transmitting, to the UE via the sidelink connection, configuration information that the peer node is to use for communications with the IAB node, wherein the configuration information comprises one or more cell identities, frequency information, system information, a cell-barred state of the distributed unit of the IAB node, child support information of the distributed unit of the IAB node, a time domain duplexing configuration, a slot status of a slot of a cell, transmission reception point information of the IAB node, a mobility state of the IAB node, or any combination thereof.

21. The method of claim 14, wherein the peer node is a user equipment (UE), the method further comprising:
transmitting, to the peer node via a downlink message, sidelink resource configuration information that the peer node is to use for communications with the IAB node via sidelink functionality of the IAB node, wherein the peer node is a UE or a second IAB node.

22. The method of claim 14, further comprising:
determining to use the distributed unit or sidelink functionality for communications with the peer node or receiving an indication that the IAB node is to use the distributed unit or the sidelink functionality from a second IAB node or a central unit.

23. The method of claim 14, wherein the peer node is a first user equipment (UE), further comprising:
communicating with the first UE using the sidelink connection based at least in part on a first mobility state of the first UE relative to the IAB node; and
communicating with a second UE using the distributed unit based at least in part on a second mobility state of the second UE relative to the IAB node.

24. The method of claim 14, further comprising:
communicating with a distributed unit of a second IAB node using the mobile termination unit of the IAB node or a sidelink functionality of the IAB node based at least in part on a mobility state of the second IAB node.

25. The method of claim 24, further comprising:
determining whether the IAB node is to be a parent node of the second IAB node or whether the second IAB node is to be a parent node of the IAB node.

26. The method of claim 24, wherein the IAB node and the second IAB node share a same central unit.

27. The method of claim 14, wherein the peer node is a second IAB node, further comprising:
communicating between the distributed unit of the IAB node and a distributed unit of the second IAB node over the sidelink connection.

28. The method of claim 14, wherein transmitting the indication that the IAB node supports sidelink communications comprises:
transmitting the indication via radio resource control signaling, in a master information block, or in a system information block.

29. An apparatus for wireless communication at a first user equipment (UE), comprising:
one or more processors;
one or more memories coupled with the one or more processors; and
instructions stored in the one or more memories and executable by the one or more processors to cause the apparatus to:
receive, from an integrated access and backhaul (IAB) node, an indication that the IAB node supports sidelink communications;
select the IAB node to relay communications between the first UE and a second wireless node based at least in part on the indication that the IAB node supports sidelink communications; and
communicate one or more data messages with the second wireless node via the IAB node in accordance with the selecting of the IAB node to relay the communications.

30. An apparatus for wireless communication at an integrated access and backhaul (IAB) node, comprising:
one or more processors;
one or more memories coupled with the one or more processors; and
instructions stored in the one or more memories and executable by the one or more processors to cause the apparatus to:
transmit an indication that the IAB node supports sidelink communications, wherein the IAB node comprises a mobile termination unit and a distributed unit;
establish a sidelink connection with a peer node according to the transmitted indication; and
communicate one or more data messages with the peer node over the established sidelink connection.

* * * * *